(12) United States Patent
Plows

(10) Patent No.: US 12,447,116 B2
(45) Date of Patent: Oct. 21, 2025

(54) BOTANICAL COMPOSITIONS

(71) Applicant: Fiona Plows, Redwood City, CA (US)

(72) Inventor: Fiona Plows, Redwood City, CA (US)

( * ) Notice: Subject to any disclaimer, the term of this patent is extended or adjusted under 35 U.S.C. 154(b) by 1083 days.

(21) Appl. No.: 17/417,378

(22) PCT Filed: Dec. 23, 2019

(86) PCT No.: PCT/US2019/068434
§ 371 (c)(1),
(2) Date: Jun. 23, 2021

(87) PCT Pub. No.: WO2020/139870
PCT Pub. Date: Jul. 2, 2020

(65) Prior Publication Data
US 2022/0110845 A1   Apr. 14, 2022

Related U.S. Application Data

(60) Provisional application No. 62/784,522, filed on Dec. 23, 2018.

(51) Int. Cl.
| | | |
|---|---|---|
| A61K 8/27 | (2006.01) | |
| A61K 8/06 | (2006.01) | |
| A61K 8/19 | (2006.01) | |
| A61K 8/29 | (2006.01) | |
| A61K 8/34 | (2006.01) | |
| A61K 8/92 | (2006.01) | |
| A61K 8/9789 | (2017.01) | |
| A61K 8/9794 | (2017.01) | |
| A61K 9/00 | (2006.01) | |
| A61K 9/107 | (2006.01) | |
| A61K 31/07 | (2006.01) | |
| A61K 33/30 | (2006.01) | |
| A61K 36/28 | (2006.01) | |
| A61K 36/30 | (2006.01) | |
| A61K 36/31 | (2006.01) | |
| A61K 36/42 | (2006.01) | |
| A61K 36/53 | (2006.01) | |
| A61K 36/738 | (2006.01) | |
| A61K 36/82 | (2006.01) | |
| A61K 36/886 | (2006.01) | |
| A61K 47/02 | (2006.01) | |
| A61K 47/10 | (2017.01) | |
| A61K 47/44 | (2017.01) | |
| A61K 47/46 | (2006.01) | |
| A61P 17/00 | (2006.01) | |
| A61Q 17/04 | (2006.01) | |

(52) U.S. Cl.
CPC ............... *A61K 8/27* (2013.01); *A61K 8/062* (2013.01); *A61K 8/19* (2013.01); *A61K 8/29* (2013.01); *A61K 8/345* (2013.01); *A61K 8/922* (2013.01); *A61K 8/927* (2013.01); *A61K 8/9789* (2017.08); *A61K 8/9794* (2017.08); *A61K 9/0014* (2013.01); *A61K 9/107* (2013.01); *A61K 31/07* (2013.01); *A61K 33/30* (2013.01); *A61K 36/28* (2013.01); *A61K 36/30* (2013.01); *A61K 36/31* (2013.01); *A61K 36/42* (2013.01); *A61K 36/53* (2013.01); *A61K 36/738* (2013.01); *A61K 36/82* (2013.01); *A61K 36/886* (2013.01); *A61K 47/02* (2013.01); *A61K 47/10* (2013.01); *A61K 47/44* (2013.01); *A61K 47/46* (2013.01); *A61P 17/00* (2018.01); *A61Q 17/04* (2013.01)

(58) Field of Classification Search
None
See application file for complete search history.

(56) References Cited

U.S. PATENT DOCUMENTS

| | | | | |
|---|---|---|---|---|
| 2008/0219938 A1* | 9/2008 | Grune | ...................... | A61K 8/27 424/59 |
| 2009/0214628 A1* | 8/2009 | de Rijk | ..................... | C02F 1/50 424/47 |

* cited by examiner

*Primary Examiner* — Nannette Holloman
(74) *Attorney, Agent, or Firm* — Shirley A. Recipon

(57) ABSTRACT

Disclosed are compositions, methods and kits for producing natural, organic personal hygiene and health maintenance products. The products can be produced and regulated under food preparation standards for safety, sterility and efficacy and personalized and prepared for an individual user in consideration of the user's sensitivities, allergies. The compositions, methods and kits are essentially free of chemically-formulated constituents, non-irritating, stable and environmentally friendly properties including organically grown raw materials and biodegradable products.

14 Claims, 4 Drawing Sheets

BOTANICAL COMPOSITIONS

CROSS REFERENCE TO RELATED APPLICATIONS

This application is a national phase entry of International Application No. PCT/US2019/068434, filed Dec. 23, 2019, which claims priority benefit of U.S. Provisional Patent Application No. 62/784,522 filed Dec. 23, 2018, each of which is hereby incorporated by reference herein in its entirety.

FIELD

The present teachings relate to compositions for topical cosmetic and pharmaceutical (drug) uses made from ingredients that are fresh ("organic, natural"), hypoallergenic and non-irritating. Additionally, the resulting products can be recognized as environmentally friendly, with an extended shelf-life as well as stable and can be produced and regulated under food preparation standards for safety, sterility and efficacy. The disclosed compositions find applications for improving the appearance of skin, blocking UV-A and UV-B rays, healing various dermatological maladies as well as providing calming and restorative benefits.

BACKGROUND

Botanic materials such as cucumber, Aloe vera, tea, rose etc. are well known to be desirable from a consumer perspective. However, from an industry perspective they tend to be expensive, difficult to incorporate into formulations, and unstable. The botanic materials themselves are often incorporated in small quantities—generally less than 1% of total volume for a given constituent—and are generally pre-processed and simplified to contain only a fraction of the original constellation of naturally occurring beneficial compounds (Simple extract). However, a product may contain only a small amount of the true natural constituents, the natural constituents may have been simplified too greatly, the natural constituents may have been replaced substantially or completely by these artificial substitutes, and/or combinations of the above. All of these scenarios are undesirable from a consumer perspective because actual true content and labelling can be deceptive and inaccurate.

Thus, the cosmetic and pharmaceutical industries have created chemically-formulated 'botanic-like' constituents that are synthetic, artificial substitutes which are most often deficient in effective levels or lacking entirely the naturally occurring beneficial constituents found in the naturally occurring botanic material. Therefore, there is a great desire in the market for creams, lotions, gels etc. including, but not limited to, topically applied products that are microbially resistant, formulated with constituents which promote or at the least do not interfere with the purpose for which it has been purposed, and are comprised of constituents that the consumer would generally regard as beneficial and safe.

Incorporation of chemically synthesized anti-microbials can also have the same considerations for human/mammalian health supra including their potential introduction into the environment and significantly into, fragile water ecosystems, e.g., coral reefs. An example are paraben preservatives that can be associated with human endocrine disruption and as allergens. Paraben can react with UV-B which increases skin aging and DNA damage—antithetical to the purpose of preventing skin damage/aging and thus, contraindicated for inclusion in sunscreen formulations.

Additionally, products are formulated to a one size fits all formula, often after extensive review prior to approval by regulatory agencies to meet manufacturing regulations, as well as after extensive testing to ensure shelf life, stability and anti-microbial resistance. The regulatory requirements preclude the opportunity for developing individualized, alternative formulations to address individual sensitivities.

Thus, there is an unmet need to provide products made with natural and organic ingredients for maintaining an individual subject's personal hygiene and health and that are formulated to achieve stability, safety and efficacy in compliance with 21 CFR. Additionally, such products can be formulated to address individual sensitivities, while adhering to manufacturing regulations and without sacrificing safety, stability and microbial resistance. Further the ingredients' constituents are utilized such that efficacy is maintained. These and other benefits are provided by the claimed inventions.

SUMMARY

Compositions, methods, and kits are provided for inhibition, treatment, and amelioration of skin conditions. The compositions described herein include organically grown, natural botanic materials/constituents and animal constituents in a stable emulsion. Also provided are methods of use by topical administration of cosmetic and/or pharmaceutical composition(s) to a subject. The disclosed compositions, formulations and products derived therefrom can have an essential absence of chemically-formulated constituents including, but not limited to, emulsifiers, fertilizers, pesticides, thickeners, stabilizers, buffers, anti-microbials, artificial preservatives, and artificial additives and can be generally non-irritating to skin/dermal surfaces of a subject.

In one embodiment, disclosed is a basic base emulsion composition comprising an emulsion for topical applications to the skin of a subject. The emulsion can result from combining an aqueous phase and an oil phase. The emulsion composition's constituents include at least one aqueous carrier, a humectant, at least one emulsification agent, at least one emollient, and a surfactant. Optionally, the emulsion composition can further have at least one botanical extract and/or one or more additive constituent(s). At least one or all of the constituents of the emulsion composition can be essentially free of chemically-formulated, artificial, synthetic, and non-naturally occurring, non-organic constituents. At least one or all of the constituents of the emulsion composition can be of natural and organic origins. The basic base emulsion composition can be at least one of protective, non-irritating, stable, environmentally friendly and combinations thereof. The constituents of the aqueous and oil phases are essentially organic and/or naturally occurring.

In another embodiment, disclosed is a natural, basic base emulsion composition for topical applications to the skin of a subject comprising an emulsion resulting from combining an aqueous phase and an oil phase. The aqueous phase constituents can include one or more aqueous carrier(s) at about 25.5-47.4 wt. %, at least one humectant at about 2.6-2.9 wt. %, at least one of a first emulsification agent, and optionally, at least one botanical extract at about 0.0-47.4 wt. % of the aqueous carrier. The oil phase constituents can include at least one emollient, at about 30.3-33.5 wt. %, at least one surfactant at about 11.3-12.5 wt. %, and at least one of a second emulsification agent at about 6.01-6.71 wt. %. The ratio of the aqueous phase to the oil phase can be about 1:1, and optionally, the finished emulsion composition can further comprise at least one additive. The basic base emulsion composition can be essentially free of chemically-formulated constituents, including additives. and can be at least one of protective, non-irritating, stable, environmentally friendly and combinations thereof. The constituents of the aqueous and oil phases are essentially organic and/or naturally occurring.

In one embodiment, the aqueous carrier can be Aloe vera juice, the humectant can be glycerin, and the first emulsification agent can be borax in the aqueous phase; the oil phase can have Jojoba oil as the emollient, the surfactant can
be coconut oil and the second emulsification agent can be Beeswax. The emulsified composition can further comprise about 0.1-25.0 wt. % Zinc oxide as an additive to provide between about 8%-20% sunscreen protection.

In another embodiment, the sunscreen protection composition can further comprise a tint for coloring and/or a cosmetic or pseudo-sun tanning effect at about 0.1-2.0 wt. % of each of one or more additives as a wt. % of the total composition. The tint can be selected from the group consisting of Red ferrous oxide, Yellow ferrous oxide and Black ferrous oxide and Mica.

In yet another embodiment, the basic base emulsion composition can have about 25.5-29.2 wt. % Aloe vera juice and further comprises about 16.4-20.1 wt. % Calendula extract in the aqueous phase, and an essential absence of additive. The resulting composition can be used, for example, as a soothing topical application following sun burning of a subject's skin/dermis.

In another embodiment, the addition as a wt. % of the total composition of about 0.1 wt. % to about 15.0 wt. % colloidal oatmeal additive to the basic base emulsion composition further having about 0.0-20.1 wt. % Calendula extract in the aqueous phase can produce a soothing and healing topical application for eczema and other skin/dermal inflammations and irritations.

In yet another embodiment, a basic base emulsion can have only about 16.4-20.1 wt. % Aloe vera juice and can further have about 25.5-29.2 wt. % Black tea extract in the aqueous phase, and in the oil phase have only about 16.4-20.1 wt. % Jojoba oil and can further have 12.8-14.6 wt. % cod liver oil in the oil phase, and an essential absence of additive. The resulting product can be used to ameliorate fine lines, swelling around the ocular area and temporarily relieve the signs of aging and restorative. The product can be applied, for example, as a night mask.

In yet another embodiment, a basic base emulsion can have only about 32.0-39.0 wt. % Black tea extract and further have about 7.00-11.0 wt. % Rose extract in the aqueous phase; and in the oil phase have about 25.5-29.2 wt. % Jojoba oil, and further have about 2.7-6.4 wt. % Cod liver oil and an essential absence of both Aloe vera juice and additive. The resulting product can be topically applied to stimulate circulation, for cosmetic affects including but not limited to, acting as an astringent to tighten skin/dermal surfaces, reduce fine lines and swelling/puffiness and diminish signs of aging as well as being restorative.

In still yet another embodiment, a basic base emulsion can have in the aqueous phase only about 25.5-29.2 wt % Black tea aqueous extract and about 16.4-20.1 wt. % Rose extract, the oil phase can have about 30.3-33.5 wt. % Jojoba oil; and an essential absence of both Cod liver oil and additive. The resulting product can be topically applied to stimulate circulation, for cosmetic affects including but not limited to, acting as an astringent to tighten skin/dermal surfaces, reduce fine lines and swelling/puffiness, diminish signs of aging as well as can be soothing and smoothing.

In another embodiment, the basic base emulsion composition can have about 25.5-29.2 wt. % Aloe vera juice and further comprises about 16.4-20.1 wt. % Rose extract in the aqueous phase; and the oil phase can have about 30.3-33.5 wt. % sweet almond oil; and an essential absence of both of Jojoba oil and additive. The resulting product can be topically applied to help keep skin soft and supple, protect against UV radiation damage as well as can be soothing and smoothing.

In another embodiment, the basic base emulsion composition can have an aqueous carrier having 25.5-29.2 wt % Witch hazel, and about 8.50-20.1 wt. % Calendula extract, and optionally about 8.50-10.0 wt. % Comfrey extract in the aqueous phase; and has an essential absence of both Aloe vera juice and additive. An aqueous carrier having Witch hazel plus Calendula or both Calendula and Comfrey extracted or co-extracted, respectively, into the Witch hazel can comprise about 0-40 wt. % of the aqueous carrier volume (i.e. from about 0-150 ml based on a 548 ml total volume) with the remaining 100 ml of aqueous carrier being either 100 ml Calendula extract or 50 ml of both Calendula and Comfrey extracts. In yet another embodiment, there can be both Calendula and Comfrey co-extracted into either water or into Witch hazel. When Witch hazel is used for extracting Calendula or both Calendula and Comfrey, it can be present as the entire aqueous carrier volume, i.e. up to 250 ml. Alternatively, the Calendula and Comfrey, when both present in the aqueous phase, can both be present as separate extractions.

In another embodiment, the basic base compositions and resulting products as described supra, can have the aqueous carrier having one or more aqueous constituents selected from the group consisting of Aloe vera juice, water, Black tea extract, witch hazel, aqueous-based extractive media and/or one or more rich botanical extracts and combinations thereof. One of skill in the art can immediately recognize that a botanic extract can be aqueous, as well as produced from the use of hydrosols/distillates for the formation of essential oils, absolutes/alcohol tinctures, $CO_2$ extracts as well as botanic materials which can be extracted into alcohol or other media, processed by e.g., drying, and then added back into either an aqueous or oil phase.

In another embodiment, the basic base compositions and resulting products as described supra, can have the humectant selected from the group consisting of glycerine, coconut oil, almond oil, lanolin, Aloe vera gel, egg yolk, egg white, honey, molasses, *Quillaia* and sugar alcohols and combinations thereof.

In another embodiment, the basic base compositions and resulting products as described supra, can have the emulsification agent(s) for the aqueous and/or oil phases selected from the group consisting of borax, beeswax, carnauba wax, coconut oil, lecithin, egg yolk proteins, agar-agar, carrageen and combinations thereof.

In another embodiment, the basic base compositions and resulting products as described supra, can have one or more emollients selected from the group consisting of jojoba oil, sweet almond oil, cod liver oil, coconut oil, vitamin E, shea butter, olive oil, avocado oil, macadamia oil, wheat germ oil, sunflower seed oil, acai oil, babassu oil, black current seed oil, borage seed oil, calendula oil, canola oil, cashew oil, castor oil, coriander oil, corn oil, cottonseed oil, crambe oil, flax seed oil, grape seed oil, hazelnut oil, hemp seed oil, linseed oil, mango kernel oil, meadowfoam oil, mustard oil, neat's foot oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, soybean oil, sunflower oil, tall oil, tsubaki oil, walnut oil, and any derivatives and/or combinations thereof.

In another embodiment, the basic base compositions and resulting products as described supra, can have a surfactant selected from the group consisting of borax, coconut oil, glycerine, and combinations thereof.

In another embodiment, the basic base compositions and resulting products as described supra, can have as the aqueous carrier and/or botanical extract a rich botanical extract selected from the group consisting of Rose extract, Calendula extract, Black tea extract, Chamomile extract and Comfrey extract, Rosemary family of extracts (Rosemarinus family), Cucumber extract, carrot extract, Kale extract, and Fruit extracts.

In another embodiment, the basic base compositions and resulting products as described supra, can have at least one or more additives selected from the group consisting of colloidal oatmeal, Red ferrous oxide, Yellow ferrous oxide, Black ferrous oxide, Mica, zinc oxide, titanium dioxide, retinol, retinoic acid, and avenanthramide containing botanicals and combinations thereof.

In yet another embodiment, the resulting products derived from the basic base compositions as described supra, can provide at least one of a cosmetic effect and/or pharmaceutical effect. The at least one pharmaceutical effect and combinations thereof can include, but are not limited to, topical moisturizing, soothing, smoothing, and can provide avenanthramide activities and can provide inhibition of: solar radiation effects, itchiness, inflammation, a skin disorder(s) and/or irritation(s). The at least one cosmetic effect and combinations thereof can be used to inhibit, provide relief, and/or ameliorate a skin condition selected from the group consisting of inhibiting solar radiation effects, itchiness, inflammation, irritation, obscuring wrinkles, diminishing the signs of aging, concealing skin discolorations, imperfections, relieving dryness, providing topical moisturizing, soothing, smoothing, tinting, and avenanthramide activities In one aspect, the topical application of the resulting products derived from the disclosed compositions supra can be suitable for treating, inhibiting or ameliorating at least one skin disorder and/or irritation selected from the group consisting of sunburn, dermatitis, eczema, seborrhea, psoriasis, xeroderma, and ichthyosis.

In another embodiment, the resulting products derived from the disclosed compositions can have an essential absence of chemically-formulated constituents including, but not limited to, emulsifiers, fertilizers, pesticides, thickeners, stabilizers, buffers, anti-microbials, artificial preservatives, and artificial additives and the products can be essentially non-irritating to skin/dermal surfaces.

In one aspect the resulting products can be biodegradable. In another aspect, the products can be at least one of non-acnegenic, non-comedogenic, hypoallergenic, and easily adherent.

In one embodiment, disclosed is a process for preparing the basic base emulsion composition and products derived therefrom comprising: preparing an aqueous phase having at least one aqueous carrier, humectant, a first emulsification agent and optionally a botanical extract; and an oil phase having at least one emollient, surfactant and a second emulsification agent; heating each phase to about 78°–84° C., optionally mixing while heating, wherein constituents of the aqueous phase dissolve and constituents of the oil phase melt; forming an emulsion and optionally, adding at least one additive either before, during or after emulsion formation. In one aspect, the resulting basic base emulsion composition is essentially free of chemically-formulated constituents.

In one embodiment, disclosed is a process for preparing the basic base emulsion composition and products derived therefrom comprising: preparing an aqueous phase having about 25.5-47.4 wt. % of at least one aqueous carrier, about 2.6-2.9 wt. % humectant, about 1.40-1.53 wt. % of a first emulsification agent and optionally about 0.0-47.4 wt. % of a botanical extract; and an oil phase having about 30.3-33.5 wt. % of about at least one emollient, about 11.3-12.5 wt. % surfactant and about 6.01-6.71 wt. % of a second emulsification agent; heating each phase to about 78°–84° C., optionally mixing while heating, wherein constituents of the aqueous phase dissolve and constituents of the oil phase melt; forming an emulsion and optionally, adding at least one additive either before, during or after emulsion formation. In one aspect, the resulting basic base emulsion composition is essentially free of chemically-formulated constituents.

In one aspect, the process of preparing a basic base emulsion composition can include formulation and preparation with naturally occurring, organic constituents.

In another aspect, the at least one additive(s) can be selected from the group consisting of colloidal oatmeal, Red ferrous oxide, Yellow ferrous oxide, Black ferrous oxide, Mica, zinc oxide, titanium dioxide, retinol, retinoic acid, and avenanthramide containing botanicals and combinations thereof.

In one embodiment, disclosed is a method of treating, ameliorating, and/or inhibiting a skin disorder in a subject in need thereof comprising topically applying an effective amount of at least one resulting product derived from the disclosed compositions to the subject suffering from the skin disorder. The skin disorder can be at least one of solar radiation effects, dermatitis, eczema, seborrhea, psoriasis, xeroderma, and ichthyosis and combinations thereof.

In one aspect, the subject that can benefit from the disclosed method of treating, ameliorating, and/or inhibiting a skin disorder is an animal. The animal is selected from one or more of a human, horse, dog, cat, domestic pig, whale, porpoise, dolphin, hippopotamus, giraffe, elephant, and sheep. In another aspect, following application of the composition the skin disorder symptom(s) can be ameliorated in the subject.

In another embodiment, disclosed is a pharmaceutical formulation for use in the inhibition, treatment or amelioration of a skin disorder or condition comprises applying one or more resulting product(s) derived from the disclosed compositions, supra.

In one aspect, disclosed is a kit having, in one or more containers, the pharmaceutical formulation(s) and resulting product(s) derived from the disclosed compositions, supra. The kit can further include instructions for use of the one or more pharmaceutical formulation(s) and resulting product(s) derived from the disclosed compositions supra in the inhibition, treatment or amelioration of the skin disorder or condition.

In another embodiment, disclosed is a cosmetic formulation for use in the inhibition, treatment or amelioration of a skin disorder or condition comprises applying one or more resulting product(s) derived from the disclosed compositions, supra.

In one aspect, disclosed is a kit having, in one or more containers, the cosmetic formulation(s) and resulting product(s) derived from the disclosed compositions supra. The kit can further include instructions for use of the one or more cosmetic formulation(s) and resulting product(s) derived from the disclosed compositions supra in the inhibition, treatment or amelioration of the skin disorder or condition.

In another aspect, disclosed is a unit dosage form comprising a therapeutically effective amount of the compositions, formulation(s) and resulting product(s) derived from the disclosed compositions supra and combinations thereof. The unit use form can have a cosmetically appropriate amount of the unit dosage form.

In another embodiment, disclosed is a method of treating a skin disorder in a subject comprising topically applying an effective amount of one or more of the compositions(s), and resulting product(s) derived from the disclosed compositions, supra to the subject, wherein treating effectively destroys all or a portion of the skin disorder.

In one aspect, the disclosed composition(s), and resulting product(s) derived from the disclosed compositions. supra, when topically applied to the subject can be at least one of mild, non-irritating, quick drying, non-sticky, and non-drying.

In one embodiment, the emulsified compositions, formulation(s) and resulting product(s) derived from the disclosed compositions, supra, can be selected from the group consisting of an oil-in-water emulsion, a water-in-oil emulsion, an oil-in-water-in-oil emulsion, and a water-in-oil-in-water emulsion.

In another embodiment, the emulsified compositions, formulation(s) and resulting product(s) derived from the disclosed compositions, supra, can be in the form of a lotion, a solution, a gel, an ointment, a patch, a paste, a liquid, a foam, a mousse, a spray, an aerosol, a triple emulsion, a nanoemulsion, a microemulsion, a hydrogel, a jelly, a dispersion, a suspension, and a tape.

In yet another embodiment, the emulsified compositions, formulation(s) and resulting product(s) derived from the disclosed compositions, supra, can be a topical formulation in the form of a lotion, a solution, a gel, an ointment, a patch, a paste, a liquid, a foam, a mousse, a spray, an aerosol, a triple emulsion, a nanoemulsion, a microemulsion, a hydrogel, a jelly, a dispersion, a suspension, and a tape.

BRIEF DESCRIPTION OF THE DRAWINGS

An understanding of the features and innovations of the present disclosure will be realized by reference to the accompanying drawings. The drawings are intended to illustrate, not limit, the present teachings. Embodiments incorporating teachings of the present disclosure can be shown and described with respect to the drawings herein, in which:

FIG. 3: Photos illustrating improvement in skin appearance following application of the disclosed oatmeal/Eczema lotion (Formulation in Example 4). The photographs were taken sequentially in time, with less than a minute between photographs.

FIG. 3B illustrates the left hand with oatmeal lotion spotted over the crepey appearing skin prior to smoothing the lotion over the back of the hand.

DETAILED DESCRIPTION OF VARIOUS EMBODIMENTS

Figure 1A:
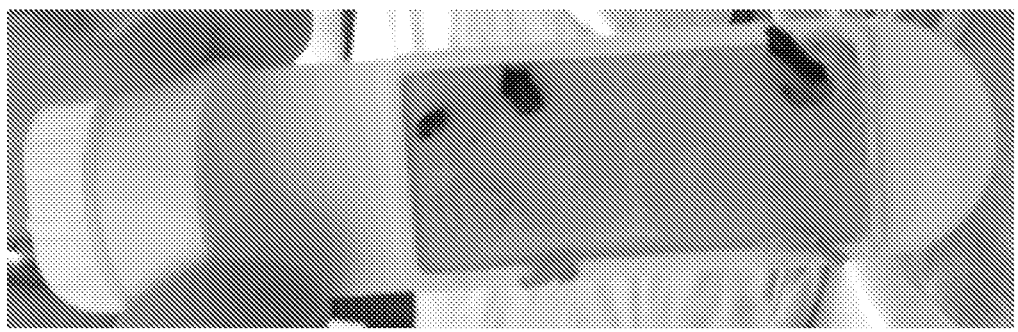
FIG. 1A depicts one side of a microslide inoculated with green mycelia.

Cosmetic and pharmaceutical formulations and methods for using the compositions in maintaining skin health and inhibiting and/or treatment of skin conditions and maladies, and anti-aging—are provided. The formulations and claimed compositions and methods disclosed herein are based on the use of naturally grown and processed botanic and animal materials having a greater level of the constellation of beneficial constituents and an essential absence of artificial, chemically-formulated ingredients. The incorporation of botanic extracts, rich botanic extracts and natural emollients, stabilizers, humectants and emulsification agents are formulated into safe, stable and efficacious emulsifications for topical applications. Topical application of the formulations described herein, for example, topical application of the claimed sunscreen, free of chemically-formulated materials, can potentially preclude sun damage and burning, as well as moisturize and smooth the skin while being environmentally friendly to vulnerable and fragile ecosystems including, but not limited to, aquatic ecosystems.

Before the compositions and methods of the present disclosure are described, it is to be understood that the invention or inventions disclosed herein are not limited to the particular processes, compositions, or methodologies described, as these may vary. It is also to be understood that the terminology used in the description is for the purpose of describing the particular versions or embodiments only, and is not intended to limit the scope of the disclosed invention which will be limited only by the appended claims. Unless defined otherwise, all technical and scientific terms used herein have the same meanings as commonly understood by one of ordinary skill in the art. Although any methods and materials similar or equivalent to those described herein can be used in the practice or testing of embodiments of the present disclosure, the claimed compositions, methods and materials are now described. Nothing herein is to be construed as an admission that the invention or inventions disclosed herein are not entitled to antedate such disclosure by virtue of prior invention.

Definitions

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

Journal papers, manuscripts, books, text books, patents and published patent applications, URLs and doi journal references as cited herein are incorporated herein by reference in their entirety for all purposes.

As used herein, the singular forms "a," "an," and "the" include plural reference unless the context clearly dictates otherwise. Thus, for example, reference to a "botanical" is a reference to one or more botanical extracts and equivalents thereof known to those skilled in the art, and so forth.

As used herein, the term "about" means plus or minus 5% of the numerical value of the number with which it is being used. Therefore, about 20% means in the range of 19% to 21%.

The following terms of art shall have the below ascribed meanings throughout this Specification.

As used herein the term "additive" can refer to one or more constituent(s) added to the claimed basic base formulation composition before, during or after emulsification to further augment and/or enhance the beneficial effects of the claimed composition. The additive can include imparting an effect including, but not limited to, moisturizing, soothing, smoothing, an avenanthramide, inhibiting, treating, and/or ameliorating a topical disorder and/or irritation. Moreover, the additive can provide a property, pharmaceutical effect, and/or a cosmetic effect(s) including, but not limited to, inhibiting solar radiation effects, itchiness and inflammation and for tinting, either in isolation and/or in combinations with one another.

As used herein the term "aqueous carrier" can refer to one or more aqueous constituents within the aqueous phase of the claimed emulsion further having either mixed, dissolved, extracted therein and/or suspended therein a botanical extract, a humectant, an emulsification agent and optionally a rich botanical extract. Aqueous carriers can include but are not limited to Aloe vera juice, water, Black tea extract, witch hazel, aqueous-based extractive media and/or one or more rich botanical extracts that can be used in isolation or in combinations with one another.

As used herein the term "avenanthramide" can refer to one or more constituents or properties of a claimed composition that can have at least one of an anti-inflammatory, anti-itch, antioxidant, and anti-irritant property, an antiantherogenic activity and/or effect either in isolation or in combination of effects upon a subject. Colloidal oatmeal is an example of a constituent with avenanthramide properties.

As used herein the term "biodegradable" can refer to a claimed composition or constituent of said composition that will disperse, degrade and/or dissipate under environmental conditions to smaller units or chemical species that are, themselves, non-toxic (environmentally friendly) to the environment, including, but not limited to, animals, plants, and prokaryotes, as well as terrestrial, atmospheric, outer space and aquatic environments. The constituents used in the claimed compositions can biodegrade such that they are biodispersed in a biofriendly manner. A non-limiting example is a mineral which can be environmentally friendly, but may not biodegrade but can be biodispersable in a biofriendly manner.

As used herein the terms "botanical," "botanic," and "botanicals" are used interchangeably and can refer to plant material(s), algae, macroscopic fungi that can be used in isolation or in combinations with one another.

Botanical products can be finished, labeled products that contain vegetable matter as ingredients. A botanical product can be a food (including a dietary supplement), a drug (including a biological drug), a medical device (e.g., guttapercha), or a cosmetic under the U.S. Federal Food, Drug, and Cosmetic Act, 21 U.S.C. 301 et. seq and/or the U.S. Dietary Supplement Health and Education Act of 1994, 21 U.S.C. 321(ff) which are incorporated by reference. An article can be generally a food if it can be used for food (21 U.S.C. 312(f)(1)). Whether an article can be a drug, medical device, or cosmetic under either of the Acts turns on its "intended use" (21 U.S.C. 312(g)(1)(B) and (C), (h)(2) and (3), (i)). As used herein, "Intended use" can refer to claims made by or on behalf of a manufacturer or distributor of the article to prospective purchasers, such as in advertising, labeling, or oral statements (U.S. HHS FDA Background: pp 2-3 Botanical as referred to in the FDA's OTC drug monograph, www.fda.gov/downloads/aboutfda/centersoffices/officeofmedicalproductsandtobacco/cder/manualofpoliciesprocedures/ucm079939.pdf Nov. 30, 2016 or refer to "Title 21 Food and Drugs, Chapter 1, Subchapters B, C and D, Part 300, including, but not limited to, Parts 328-369, www.gpo.gov/fdsys/search/pagedetails.action?collectionCode=CFR&searchPath=Title+21%2FChapter+I%2FSubchapter+D%2FPart+300&granuleId=&packageId=CFR-2009-title21-vol1&oldPath=Title+21%2FChapter+I%2FSubchapter+D&fromPageDetails=true&collapse=true&ycor), which are incorporated by reference.

As used herein the term "botanical extract" can refer to an extraction of botanic material using hydrosols/distillates for the formation of essential oils, absolutes/alcohol tinctures, $CO_2$ extracts as well as botanic materials which can be extracted into alcohol or other media, processed by e.g., drying, and then added back into either an aqueous or oil phase as is known to the skilled artisan. To illustrate, the commercial essential oil product normally available provides only a collection of the volatile constituents extracted by either distillation or expression (https://www.naha.org/explore-aromatherapy/about-aromatherapy/how-are-essential-oils-extracted/) and, as such, may not be complex representation of the full constellation of botanic molecules within the botanic material.

For example, thyme extract is generally 50-70% of a single molecule, Thymol; this is obviously in no way representative of the native occurrence/full constellation of botanic molecules within the plant. Absent are, for example, p-cymene, myrcene, borneol, and linalool ("Composition of Thyme Essential Oil". Scienceofacne.com) Furthermore, hydrosols, floral waters, steam distillates can be within the (concentrated) water phase on top of which the essential oil can be floating, though again, less volatile materials and particulates, may not be incorporated into this collection. In general, this is the advantage of such; collection of a volatile but stable fragrance from rose, for example, without incorporation of compounds that are labile or plant-based (particulates) matter that has a higher possibility of precipitation, reaction, contamination and/or putrefaction. There does exist the possibility of reductio ad absurdum, i.e. the desired properties of the botanic material (for which it is valued) can be reduced or removed once the extract has been concentrated. This can be illustrated when comparing a concentrated vitamin or mineral (higher level of desired molecules) and its biopresented/bioavailable form (decreased level of desired molecules). Additionally, tinctures represent a more complex extraction into an alcoholic solvent (as such, non-identical to extraction) but are much less widely used in cosmetics formulations.

When referring to an "extract" it is understood that tinctures, teas, distillates, etc. can result from various extraction methods including, but not limited to, maceration, infusion, percolation, digestion, decoction, hot continuous extraction, aqueous-alcoholic extract, concoction, counter current extract, microwave assisted extraction, ultrasound extraction, supercritical fluid extracts, etc. The resulting "extract" can also be used interchangeably as a constituent(s) within the disclosed formulations and compositions as would be understood by one of skill in the art. Moreover, an infusion can be interchangeable with an extract within the disclosed formulations and compositions.

As used herein the term "rich botanical material" can refer to an extraction of the botanic material into the e.g., an aqueous phase of a molecular collective that is as representative as possible of the complex representation of the full constellation of botanic molecules within the botanic material complex and, as such, can be distinguished from the commonly used hydrosols/distillates, essential oils, absolutes/alcohol tinctures, $CO_2$ extracts as well as botanic materials which can be extracted into alcohol or other media, processed by e.g., drying, and then added back into either an aqueous or oil phase as is known to the skilled artisan.

As used herein the term "rich medium" and "rich extraction media" are used interchangeably and can refer to a non-simple solvent, that is, it is not a pure solvent. Ethanol would be an example of a pure solvent. An example of a "rich extraction media/non-simple solvent can include, but is not limited to, Aloe vera juice which has multiple constituents therein. Extraction of a botanical into a rich medium takes advantage of the greater ionic strength of the rich medium as the greater the solvation capacity of the rich medium the easier to produce a rich botanical extract which can be a more complete representation of the full constellation of botanic molecules within the material complex of the botanic.

The definitions of Botanical, Botanical product, a Botanical drug product, a Botanical drug substance, a Botanical Component, a Botanical raw material, a Multi-Herb (Botanical Drug) substance or product, and a Plant material are derived from US HHS FDA Center for Drug Evaluation & Research (CDER) June 2004, Chemistry, p. 39, incorporated herein by reference.

The terms Botanical and; Botanical Product as defined by the CDER can refer to a finished, labeled product. The product can contain vegetable matter, including, but not limited to, plant materials, algae, macroscopic fungi, and combinations of these. A botanical product can be at least one of a food, drug, medical device, or cosmetic depending on the use.

A Botanical Drug Product as used herein and defined by the CDER can refer to a botanical product that is intended for use as a drug and is prepared from a botanical drug substance. The dosage forms for botanical drug products include solutions (e.g., teas), powders, tablets, capsules, elixirs, and topicals.

A Botanical Drug Substance as used herein and defined by the CDER can refer to a drug substance derived from one or more plants, algae, or macroscopic fungi. One or more of the following processes can be used to prepare a botanical drug substance from botanical raw materials: pulverization, decoction, expression, extraction, ethanolic extraction, or other similar process. The resulting botanical drug substance can be in a physical form including, but not limited to, a powder, paste, concentrated liquid, juice, gum, syrup, or oil. One or more botanical raw materials can be used to produce a botanical drug substance. Both highly purified and chemically-modified substance derived from natural sources are not included as a botanical drug substance.

A Botanical Component as used herein and defined by the CDER can refer to a constituent that originates from a botanical raw material used in either a botanical drug substance or product.

A Botanical Raw Material as used herein and defined by the CDER can refer to a fresh or processed alga, macroscopic fungus or a part of a single species of plant (e.g., cleaned, frozen, dried, or sliced).

A Multi-Herb (Botanical Drug) Substance or Product as used herein and defined by the CDER can refer to the derivation of either a botanical drug substance or a drug product from more than one botanical constituent, i.e., each constituent can be a botanical raw material. Preparation of a multi-herb botanical drug substance can include the processing together of two or more botanical raw materials, or by combining two or more individually processed single-herb botanical drug substances from their corresponding raw materials. In the latter case, during the manufacturing process of the dosage form the two or more individual single-herb botanical drug substances may be introduced simultaneously or at different stages.

A Plant Material as used herein and defined by the CDER can refer to the plant part (e.g., bark, wood, leaves, stems, roots, rhizomes, flowers, fruits, seeds, kernels, or parts thereof, the plant) as well as exudates thereof.

As used herein the term "chemically-formulated" can refer to a constituent(s) including, but not limited to, a carrier, emollient, excipient, emulsification agent, humectant, surfactant, an additive(s), artificial/synthetic chemical fragrances, and chemically-formulated and/or artificial/synthetic constituents including, but not limited to, dyes, colorants, flavoring agents, adsorbents, lubricants, solvents, alcohols, anti-irritants, anti-bacterial, anti-fungal and antimicrobial agents, antioxidants, chelating agents, preservatives, pH adjusters, absorbents, structuring agents, thickeners, waxes, stabilizers, buffers, silicone containing compounds, thickening agents, skin conditioning agents, skin bleaching and lightening agents, exfoliants, waterproofing agents, conditioning agents, film formers, fertilizers, pesticides, artificial preservatives, and artificial additives.

Natural absorbents can include, but are not limited to starch, potato starch, corn starch, oat starch and talc.

Natural thickening agents can be substances that can increase the viscosity of a composition including, but not limited to natural polysaccharides, and natural gums.

Chemically-formulated constituents, ingredients and compounds can be made as an artificial replicant or synthetized in vitro or in silico in an attempt to simulate a constituent additive that is a naturally occurring material in at least one of a terrestrial, atmospheric, and aquatic environments. Naturally occurring materials are of animal, vegetable or mineral origin and derivative thereof either in isolation or in combination with one another.

As used herein the term "constituent" can refer in the disclosed formulations and claimed compositions to an ingredient, a material, including, but not limited to, an herb, herbal extract, tea, infusion, flower, flower extract, an aqueous carrier, an oil carrier, a plant oil, nut oil, tree oil, mineral, an additive, juice, aqueous solution, sap, wax, animal oil, humectant, emulsification agent, surfactant, etc. that can be utilized within the food industry. This includes aspects covering a collection of the raw materials (ideally essentially organic including, but not limited to, insecticide- and pesticide-free, grown without toxic persistent pesticides, no use of synthetic fertilizers, no sewage sludge, absent GMOs, no use of antibiotics, synthetic growth hormones and irradiation and to food safety standards), preparation (to food safety standards), packaging, distribution, and storage and compositions made from the constituents for use by the consumer (e.g. at room temperature, within a refrigerator or cool box, and/or with clearly stated shelf life and/or expiration date) A full description of USDA Organic standards can be found in the "Organic Food Production Act," "USDA organic regulations" (CFR Title 7.B.1.M. Part 205) and the "National Organic Program Handbook" each incorporated by reference herein. There also exists the possibility for onsite preparation within a retail setting and timely consumption and within posted expiration dates, as well as take-away preparation, consumer preparation, delivery and distribution through direct to business and direct to consumer channels.

As used herein the term "cosmetic" and "cosmetic effect" can refer to composition topically applied to the skin, hair or nails which can provide a temporary affect to the appearance of the skin, hair or nails.

As used herein the term "dermatitis" can refer to inflammation and/or irritations of the skin and can result from an adverse reaction to a chemical, a chemical compound, or metal. The dermatitis can be either of natural or synthetic origin including, but not limited to, plant, e.g., poison ivy, poison oak, poison sumac; an insect bit, or an allergen, a metal, a metal alloy, a metal element, and a drug.

The term "mild" as used herein can refer to a cosmetic or pharmaceutical composition that can be non-acnegenic, non-comedogenic, hypoallergenic. The composition can also be non-irritating and following topical application can be quick drying—i.e., does not remain wet on the skin/dermal surface and non-sticky to the touch as well as non-drying of the skin/dermal surface.

The phrase "skin conditioning agents" as used herein can refer to a cosmetic or pharmaceutical composition that can impart a plumping, soothing, smoothing, and softening to the surface of the skin's appearance and/or how the skin feels when a, for example, finger is rubbed across the skin. An example includes, but is not limited to Aloe extracts.

As used herein the term "surfactant" can refer to compounds that lower the surface tension (or interfacial tension) between two liquids, between a gas and a liquid, or between a liquid and a solid. Surfactants may act as emulsifiers, detergents, dispersants, foaming agents and wetting agents. An example includes, but is not limited to coconut oil.

The disclosed formulations, claimed compositions, methods and methods for use in hygiene, cosmetic, health maintenance and pharmaceutical products and kits can be prepared using methods and processes used to ensure safety, stability and potency that are well established for foodstuffs. Such methods and processes are well established and comply with food industry guidelines including 21 CFR. Applying food industry best practices and processes when formulating and producing the claimed compositions and methods to produce for use in hygiene, health maintenance and pharmaceutical products and kits provides compliance with industrially recognized requirements and expectations for safety and efficacy while maintaining raw material integrity and product stability under appropriate packaging selections infra, natural preservation processes and conditions including, but not limited to, room temperature, refrigeration and freezing.

The disclosed compositions. topically applied, are premised on a discovery of inhibitors (protectants) and moisturizers that utilize organic, naturally occurring and biodegradable constituents (ingredients) that are essentially free of chemically-formulated constituents. The combination of the selected constituents in the claimed compositions form stable, soothing, non-irritating, and environmentally friendly emulsified products for uses including, but not limited to, topical applications for moisturizing as well as protecting/inhibiting, treating and/or ameliorating at least one skin disorder and/or condition.

The claimed compositions have an essential absence of artificial/synthetic chemical fragrances, and chemically-formulated and/or artificial/synthetic constituents including, but not limited to, a carrier, emollient, excipient, emulsification agent, humectant, surfactant, an additive(s), dyes, colorants, flavoring agents, adsorbents, lubricants, solvents, alcohols, anti-irritants, anti-bacterial, anti-fungal and anti-microbial agents, antioxidants, chelating agents, preservatives, pH adjusters, absorbents, structuring agents, carriers, emollients, emulsification agents, surfactants, humectants, thickeners, stabilizers, buffers, silicone containing compounds, thickening agents, conditioning agents, skin bleaching and lightening agents, exfoliants, waterproofing agents, conditioning agents, film formers, fertilizers, pesticides, artificial preservatives, and artificial additives.

Materials regarded in common parlance as "chemical" in type are those generally, though not exclusively, artificial and/or synthetic compounds whose general purpose is to alter the manufacturability, stability, microbial resistance, mechanical and/or functional properties of a cosmetic or pharmaceutical formulation. Such artificial and/or synthetic compounds include, but are not limited to, emulsifying agents (individual or multiple), waxes, antioxidants, anti-microbial agents, thickening agents, and so forth. Broadly, the general intent of a cosmetic or pharmaceutical formulation is to generate a product that is of pleasing quality (texture, appearance, fragrance and so forth), possesses stability, microbially resistant, incorporable into the desired packaging, and of reasonable cost. However, efficacy, quality, and concentration of the purported "natural" material (e.g. cucumber in a "cucumber shampoo"), particularly for cosmetics where label claims may not be made, may or may not be a consideration by the manufacturer. Compounding this difficulty for the consumer is the situation that those other materials such as inert waxes, anti-microbials and the like, may have a net negative effect post-application even if such materials are on the FDA list of Generally Recognized as Safe (GRAS) and/or Generally Recognized as Safe and Effective (GRASE, for drugs) ingredients. Such ingredients might be generally categorized as providing a greater benefit to the manufacturer (in terms of cost, shelf life, ease of manufacture and so forth) than to the consumer (in terms of quality, provision of the desired material's properties and efficacy). Ingredients and a product's appearance qualities are of course designed for consumer appeal but this does not, of necessity, confer and/or guarantee either quality, efficacy or health benefits to the consumer.

Importantly, such a cosmetic or pharmaceutical formulation does not necessarily confer safety for all users and all applications. In addition, "natural" is not interchangeable with "safe" or "well tolerated" and care must be taken thereof. To illustrate, presented are two canonical examples of anti-microbials described as "natural" and that are commonly incorporated into cosmetics; Sodium benzoate and Sorbic acid/Potassium sorbate. Each are commonly utilized and can be found to be naturally occurring within foodstuffs, at low concentrations. However, when applied topically, Sodium benzoate may induce effects such as Nonimmunologic Contact Urticaria (10% of subjects), Asthma symptom exacerbation, and also Anaphylactoid reactions, Chronic Urticaria, Orofacial Granulomatosis, and Neonatal Hyperbilirubinemia exacerbation. Sorbic acid/Potassium sorbate is well-documented to induce Immediate Nonspecific Contact Erythema (50-70% of users applying topicals), Allergic Contact Dermatitis, and Ocular Reactions (Handbook of Food, Drug and Cosmetic Excipients, S.C. Smolinske, CRC Press, Inc. Boca Raton, FL. 1992).

An example of a common synthetic anti-microbial is Benzalkonium chloride. This ingredient, despite popular use industrially as an anti-microbial agent in soap and cosmetics, is well-known to have deleterious effects when used by humans, presenting as moderate to severe reactions such as Direct Irritation occurring in 66% of subjects at concentrations of 0.5% or higher. Delayed Hypersensitivity ("sensitization") may occur rarely in the general population but occurs at rates of 5% in patients with Eczema. Asthmatic patients utilizing bronchodilator medications incorporating this anti-microbial may instead experience Bronchoconstriction, the exact opposite effect for which the bronchodilator was prescribed. Ocular Toxicity and Nasal Toxicity may also be observed (Handbook of Food, Drug and Cosmetic Excipients, supra). This is an example of a compound that is poorly tolerated by the general population and may be especially risky, in terms of both short-term acute effects and long-term effects, particularly within a more vulnerable population such as infants with Eczema.

Moreover, there are marketed examples in which manufacturers incorporate Benzalkonium chloride into lotions produced for skin relief within this vulnerable population. To the general public, the incorporation of compounds with adverse effects such as those displayed by Benzalkonium chloride into a product meant for children with Eczema and/or asthmatics, would be undesirable. However, the user of a cosmetic or pharmaceutical is lulled into a false sense of safety and efficacy because a chemical is listed on a product label; yet an ingredient list would not disclose, for example, the potential adverse effects of Benzalkonium chloride. Consequently, there exists within the conscientious and impacted public enormous frustration and a general lack of trust in product ingredients and labeling. It may be seen, then, that application of a topical treatment for skin relief may well include an anti-microbial that will in fact induce skin irritation and possibly lead to more serious side effects, supra. The claimed compositions have addressed sensitivities, acute and long-term effects, by avoiding the use of chemically-formulated ingredients and "natural" materials having adverse impacts on vulnerable populations. Surprising is that the disclosed formulations and claimed compositions and methods are simple in terms of constituents and to produce and yet, this entire area of cosmetic and pharmaceutical formulations has been disregarded to address the needs of vulnerable populations.

Products which contain only organic and natural ingredients including, but not limited to, herbal extracts, botanicals, fruit, dairy, honey and the like, made with organic ingredients certified by the USDA, and using "Organic" processing and manufacturing methods, supra, and absent chemicals whose name can only be translated by a Chemist, have become extremely desirable within the cosmetics and pharmaceutical industries. However, the inclusion of such "natural" material(s) can have a problem in terms of a). efficacy—as quality may vary from lot to lot with organic materials, b.) stability—as such compounds and materials are often by nature transient and spoil and/or degrade easily, and c.) safety—as they may be ideal substrates for microbial growth or even sources of contamination, as well as having the potential for degradative by-products. These problems can be further complicated by the standard FDA requirements for safety (all products), efficacy (where claims are made) and compliance (where claims are made) as listed supra in the U.S. Federal Food, Drug, and Cosmetic Act, 21 U.S.C. 9.

Industrially formulated and manufactured products for the cosmetic and pharmaceutical (health and beauty aid) markets are normally formulated to one formula often after extensive review prior to approval by regulatory agencies to meet manufacturing regulations as well as extensive testing to ensure shelf life, stability and anti-microbial testing. The regulatory requirements have consequences for the manufacturing, formulation and packaging requirements of products precluding the opportunity for individualized, alternative formulations to address individual sensitivities. Thus, cosmetics and pharmaceuticals industrially manufactured markets notoriously ignore individual sensitivities to ingredients that cause, for example, headache, nausea, skin irritations, allergic reactions etc. and can imped proper dermal functioning, i.e. are acnegenic and/or comedogenic and/or causative of inflammatory reactions. Sensitivities can be observed on exposed skin surfaces as well as around sensitive zones such as eyes and nasal areas. Such sensitivities are especially problematic for an individual having difficulty maintaining consistent and continuous healthy skin appearance. Additionally, such sensitivities can adversely impact quality of life.

The inventor has discovered an alternative to mass produced, over-the-counter personal hygiene and health maintenance products. Applicant has found that by utilizing constituents that are predominantly of botanic origins as well as material(s) that are natural, organic ingredients in conjunction with best practices for food manufacturing that they can produce hygiene and health maintenance products that can be non-irritating, non-inflammatory, non-aging and have superior moisturizing, soothing, smoothing and softening properties as well as healing and restorative effects. The compositions produced using non-allergen, non-irritating, natural, organic constituents are not only environmentally friendly but have been shown to improve and promote skin health.

Mass produced products are notorious for containing chemically-formulated, artificial and/or synthetic ingredients and preservatives and potentially toxic chemicals that can be irritants, allergens and potential carcinogens. Furthermore, mass produced products fail to consider an individual's skin sensitivities, irritations or allergies. To illustrate, consider the use of petroleum jelly containing an added active ingredient plus a preservative mixed into the petroleum jelly. First, the petroleum must contain the added active ingredient at a useful concentration such that it can be accessible to the skin. There should be no inhibitors such as a wax or oil that would sit atop the skin to preclude active ingredient penetration into the skin, e.g., penetration into the skin's epidermis and dermal layers. Additionally, the petroleum jelly can contain an anti-bacterial(s) (e.g., preservative(s)) that can be irritating to the skin and so further limit the beneficial impact of the active ingredient). In other words, the desired active ingredient would need to penetrate through a petroleum jelly base (inert inhibitor) in order to enter into the skin. However, when the preservative can be both an inhibitor as well as irritating to the skin the preservative acts as an active inhibitor-acting in opposition the benefits provided by the active ingredient normally obtained when applying the petroleum jelly to the skin.

Thus, because of the active inhibition action of the preservative the subject who's had the petroleum jelly plus active ingredient applied to their skin will be unable to obtain the full benefit of the active ingredient. Therefore, mass produced and highly chemically-formulated personal hygiene and health maintenance products are more likely than not failing to delivery their purported maximum benefits due to the intrinsic use of e.g., chemical preservatives known to be skin irritants and inhibitors.

Emulsion Phases:

The disclosed compositions are simplistic formulations. There are few constituents, each being easily understood by the non-chemist and can be of a natural and organic origin. The claimed compositions offer a variety of formulations for wholesome and healthy cosmetic, therapeutic and inhibitory effects and impacts. Each formulation can be non-irritating, hale, stable and environmentally friendly. Each formulation can originate from a basic base emulsion formula, to be topically applied. The compositions can arise from emulsifying aqueous and oil phases to produce the basic emulsion base formula.

Basic Base Emulsion Formulation:

An "emulsion" as used herein can refer to the act of bring normally insoluble or immiscible constituents and/or mixtures together via combining at least two or more different phases. The at least two constituents/mixtures can be in at least one of two different phases, either dispersed or continuous. The two phases can include, but are not limited to, liquid phases, e.g., an aqueous phase and an oil phase. When emulsified together an at least one dispersed phase liquid is "dispersed" in an at least one continuous phase liquid. For example, in an oil-in-water emulsion the oil is dispersed within the continuous water phase and in a water-in-oil emulsion water droplets are dispersed within the continuous oil phase. An "emulsifier" or "emulsification agent" can be a constituent used for stabilizing an emulsion.

The Aqueous phase, in one embodiment, can comprise at least one of a liquid, solution optionally comprising at least one dissolved or suspended material in a polar liquid and the Oil phase can comprise at least one of a liquid, oil and optionally comprising at least one melted and/or suspended or otherwise disperse material in a non-polar liquid. Combining the different phases together can form am emulsion. Formation of the emulsion between Aqueous and Oil phases can be facilitated by mixing, drip methods, and vaporization techniques and other methods. Depending upon the scale of manufacturing emulsion formation can be facilitated by one or more of high-shear mixing, e.g., a blending stick, creating a vortex and other methods known to one of skill in the art.

Aqueous Phase

The Aqueous phase as disclosed herein can comprise an aqueous carrier, optionally, at least one botanical extract, and/or at least one rich botanical extract which can or cannot also be considered the aqueous carrier, at least one humectant and at least one emulsification agent in combinations with one another. Envisioned are aqueous carriers such as water and water-soluble plant juices including, but not limited to, Aloe vera juice, Aloe vera pulp, black tea extract and Witch hazel water.

As an aqueous carrier Aloe vera juice can be organically grown, and can be cold-pressed and used fresh although reconstituted or pasteurized Aloe vera juice could be used but may lack the molecular constellation (natural constituents/botanic molecules) of fresh juice. The aqueous carrier can also be a mixture of an organic water-soluble plant juices including and sterile water at about 25.5-47.4 wt. % and/or result from water-soluble plant juices including being the solvent used in a botanical extraction to form a rich botanical extract or result through the admixture of water-based infusions or botanical material extracts or may contain material extracted using the rich botanical extract process supra.

The Aloe vera juice and pulp offers numerous advantages when incorporated into a topical composition. It can be a skin permeation enhancer, can itself be adsorbed by the skin, promote wound healing, provides anti-bacterial, anti-fungal and anti-viral activities, can be anti-inflammatory and can be an excipient in pharmaceutical formulations.

Black tea is known to contain both caffeine and tannins. Caffeine can be a circulatory stimulant and tannins can function as an astringent.

Witch hazel has long been known for treating swelling, inflammation, tumors, and skin irritations such as eczema and psoriasis.

Rich botanical extracts envisioned include, but are not limited to, Rose, Calendula (marigold) and Comfrey extracts. As with all waters and extracts the botanical materials can be infused, distilled or extracted directly into the aqueous solution, emollient and/or carrier to capture the heterogenous constellation of botanic molecules of the botanical. The produced rich botanical extract can be recovered from the processed solution.

Rose extract can be obtained from rose cultivars *Rosa damascene* and *Rose centifolia* by using the petals for extraction. The resulting essential oil, *Rose absolute* or concrete/$CO_2$ can be used as an antiseptic, bactericidal, skin/dermal healing as well as providing youthful appearing skin while the aroma can be calming and promote circulation and heart health.

Calendula, such as *Calendula officinalis* extracts and teas as can be obtained from at least the whole flowers and flower petals are known to have anti-viral and anti-inflammatory properties, reduce inflammation, soothing irritated tissue and can aid in controlling bleeding.

Comfrey extract as can be obtained from *Symphytum officinale* by using the root, rhizome and leaves for extraction can provide relief from irritation and wound healing.

The terms "emulsification agent" and "emulsifier" are used interchangeably herein and can refer to a substance that can increase the kinetic stability of an emulsion. Emulsifiers, in general, have a polar (hydrophilic) part that is water soluble and a non-polar (lipophilic or hydrophobic) part. This results in emulsifiers being either more or less soluble in water or in oil. An emulsifier more soluble in oil can facilitate a water-in-oil emulsion and when more soluble in water, the emulsifier can generally form an oil-in-water emulsion. Surfactants are one class of emulsifiers with detergents a sub-class of surfactants.

Emulsification agents can include, but are not limited to, borax (a detergent), coconut oil, lecithin, shea butter, Beeswax and Carnauba wax. borax, at sufficient concentration, e.g., about 1.40-1.53 wt. %, when incorporated into the water phase prior to emulsification, precludes microbial growth (both bacterial and fungal) within the aqueous droplets.

borax is a mineral and is also known as sodium borate, sodium tetraborate and disodium tetraborate and as used herein is the salt of boric acid. It can be used as an emulsification agent, has anti-microbial properties and can be a component of cosmetics and detergents.

Beeswax is produced by honeybees of the genus Apis. It is composed predominantly of long chain (30-32 carbons) oleate, palmitate and palmitoleate esters. It is spoilage resistant and has found uses from cosmetics and pharmaceuticals to adhesives, finishes and sealing as well as candles and as an artistic tool. Beeswax can function as an emulsification agent and can act as a soothing agent and assist in moisture retention as a component of compositions applied topically.

Carnauba wax, also known as Brazil wax and palm wax, is uniquely produced in the leaves of the palm *Copernicia prunifera* a plant native to Brazil's northeastern states. It comprises about 40 wt % aliphatic esters, 21.0 wt % diesters of 4-hydroxycinnamic acid, 13 wt % ω-hydroxycarboxylic acids and 12 wt % fatty alcohols, being derived from acids and alcohols in the C26-C30 range. It is hypoallergenic and finds use in both the cosmetic and pharmaceutical industries for use an emollient, thickener and emulsification agent. Carnauba wax can act as a soothing agent, assist in moisture retention and as a component of compositions applied topically.

Surfactants and humectants, at about 2.6-2.9 wt. %, e.g., glycerine, in the aqueous phase and at, for example, about 11.3-12.5 wt. %, e.g., coconut oil, in the oil phase reduce surface tensions between the aqueous and oil phases to facilitate formation of a stable emulsion.

Humectants can be used to retain moisture by attracting moisture in the air via absorption. When applied to the skin, a humectant can draw water into the stratum corneum, the outermost layer of the epidermis consisting of dead cells. The stratum corneum functions as a barrier to infection, dehydration, and chemical and/or mechanical induced stress to the underlying tissue. Humectants can have an emollient effect. Examples of natural humectants include, but are not limited to, glycerine, coconut oil, almond oil, lanolin, aloe vera gel, egg yolk, egg white, honey, molasses, *Quillaia* or sugar alcohols (e.g., glycerol, sorbitol, xylitol, maltitol).

Oil Phase

The oil phase of the disclosed compositions comprises at least one emollient, a surfactant and an emulsification agent. Emollients used in cosmetic and pharmaceutical products can provide skin protection, moisturizing and aid in healing. An emollient can reduce water evaporation from the skin by forming a coating on the surface of the stratum corneum, blocking water loss. Envisioned emollients can be oils such as vegetable, nut, seed, and tree oils including, but not limited to, Jojoba oil, sweet almond oil, coconut oil and responsibly and sustainably sourced animal oils including, but not limited to, cod liver oil.

Jojoba oil is produced from the seed of the *Simmondsia chinensis* (Jojoba) plant, native to southern California, southern Arizona and northwestern Mexico. Its composition is about 97% mono-esters of long-chain fatty acids and alcohols and only a minute fraction of triglyceride esters. Consequently, it has very long shelf-life, stability and exceptional resistance to high temperatures compared to traditional vegetable oils.

Jojoba oil is known to be inherently anti-fungal and can aid in formation of a stable water-in-oil emulsion by application of sufficient shear force allowing for protection of aqueous droplets. Jojoba oil can assist in retention of skin moisture and has also been found to have anti-microbial activities. Further, extracts from both Jojoba leaves and roots have been shown to have anti-fungal properties.

Sweet almond oil is produced from the dried seed kernel of *Prunus amygdalus*, a tree cultivated predominantly in California as well as Spain, Monaco and Iran as well as Italy and Australia. It is composed of monounsaturated oleic acid, linoleic acid, and palmitic acid, a saturated fatty acid. It is also a source of Vitamin E. The fixed oil prepared from the seed of the almond fruit is termed *Oleum amygkalee* and can be derived from either sweet or bitter almonds. Almond oil can function as an emollient, and when topically applied can keep skin soft and supple and can protect against UV radiation damage.

The coconut palm *Cocos nucifera* yields Coconut oil which is extracted from the kernel or meat of mature coconuts. The high saturated fat content of Coconut oil results in it being slow to oxidize and is therefore rancidification resistant and resists degradation when kept a 24° C. for about 180 days. Coconut oil can function as both a surfactant and as an emollient. It can also form a protective layer on the skin and so finds use as a protectant in subjects suffering from skin irritations such as Eczema and offers soothing and moisturizing effects when a constituent of the claimed compositions when applied topically.

Cod liver oil is derived from the genus *Gadus*, a cold-water fish found in both the colder waters of the northern Atlantic and Pacific oceans. It is a nutritious source of fat-soluble Vitamins A, D, E and omega-3 fatty acids (EPA and DHA). Cod liver oil provides soothing and smoothing of the skin and can be restorative as Vitamin E is considered by some to support wound healing and reduced scar tissue formation. Cod liver oil can function as an emollient.

A. Herbs Used in Botanical Herbal Extracts

Various herbs can be used in the practice of the disclosed innovations. The disclosed innovations can include any one or more of an extract(s) from Aloe (*Aloe vera*), Calendula/Marigold (*Calendula officinalis*), Chamomile (*Matricaria chaomilla*), Comfrey (*Symphytum officinale*), Black tea (*Camellia sinensis* var. *sinensis* or var. *assamica*), Rose (*Rose* sp. petals and/or whole flower), a Healing herbal extract (including, but not limited to, at least two constituents, 1 tbls. each, selected from: Marigold flowers, Chamomile flowers, Comfrey leaf and Comfrey root powder) in 1.5 cups distilled water, witch hazel (*Hamamelis* sp., including, but not limited to, *Hamamelis virginiana*), and herbs from the family Lamiaceae including, but not limited to, basil, hyssop, lavender, marjoram, mint, oregano, *perilla*, rosemary, sage, savory, and thyme.

1. Calendula/Marigold (*Calendula officinalis*) is a perennial with aromatic flowers, fruit, and seeds. It is likely native to southern Europe and is found in warm temperate regions worldwide.

The inventor has discovered that extracts of *Calendula officinalis* have several biological activities, which can be beneficial to skin, inflamed skin as well as promoting healing of inflamed dermal surfaces. The yellow petals (florets) of *Calendula officinalis* can be used to obtain the corresponding extract.

2. Chamomile (*Matricaria chaomilla*) is a member of daisy-like plants of the family Asteraceae belong to the flowering plant family Angiospermae of which there are over 23,600 species having flowers and seeds. It has worldwide distribution and is commonly found in arid and semi-arid regions of subtropical and lower temperate latitudes.

The inventor has discovered that extracts of *Matricaria chaomilla* have several biological activities, which can be beneficial to skin, inflamed skin as well as promoting healing of inflamed surfaces. All of the different portions of *Matricaria chaomilla* can be used to obtain the corresponding extract. Non-limiting examples include its leaves, stems, roots, flowers or flower buds, seeds, and the entire plant (i.e., whole plant).

3. Comfrey (*Symphytum officinale*) is a perennial flowering plant with seeds. It is native to Europe and as an introduced species in North America and elsewhere.

The inventor has discovered that extracts of *Symphytum officinale* have several biological activities, which can be beneficial to skin, relief to irritated skin as well as promoting healing of inflamed skin/dermal surfaces. Many of the different portions of *Symphytum officinale* can be used to obtain the corresponding extract. Non-limiting examples include its leaves, roots, and rhizome.

4. Lamiaceae is known as the "mint" family. The flowering plants may be annual or perennial with all parts being aromatic and include many widely used culinary herbs, including but not limited to basil, hyssop, lavender, marjoram, mint, oregano, *perilla*, rosemary, sage, savory, and thyme. The plants in the Lamiaceae family have a cosmopolitan distribution.

The inventor has discovered that extracts from members of the Lamiaceae family have several biological activities, which can be beneficial to skin, inflamed skin as well as promoting healing of inflamed dermal surfaces. All of the different portions of the Lamiaceae family can be used to obtain the corresponding extract. Non-limiting examples include its aerial parts, leaves, twigs, stems, flowers or flower buds, seeds, and the entire plant (i.e., whole plant).

B. Non-Herbs Used in Botanical Non-Herbal Extracts

1. Aloe (*Aloe vera*) is a succulent with thick, fleshy leaves serrated at the margins. It is found growing wild in tropical climates worldwide.

The inventor utilizes extracts of *Aloe vera* for its several biological activities, which can be beneficial to skin, inflamed skin as well as promoting healing of inflamed dermal surfaces. All of the different portions of *Aloe vera* can be used to obtain the corresponding extract. Non-limiting examples include its leaves, stems, roots, flowers or flower buds, sap, and the entire plant (i.e., whole plant).

2. Black Tea is a type of tea made from the leaves and leaf buds of an evergreen shrub or tree (*Camellia sinensis* var. *assamica* and to a lesser extent *C. sinensis* var. *sinensis*) of the flowering plants in the family Theaceae. *C. sinensis* is native to East and Southeast Asia and the Indian subcontinent and is cultivated worldwide in tropical and subtropical regions.

The inventors have discovered that extracts of *Camellia sinensis* subsp. have several biological activities, which can be beneficial to aging skin, inflamed skin as well as promoting healing of inflamed dermal surfaces. Different portions of *Camellia sinensis* subsp. can be used to obtain the corresponding extract.

3. Witch-hazel (*Hamamelis* sp., including, but not limited to, *Hamamelis virginiana*) is a deciduous tree native to eastern North America, from Nova Scotia west to Minnesota and south to eastern Texas and central Florida.

The inventor has discovered that extracts of *Hamamelis* sp., have several biological activities, which can be beneficial to inflamed skin as well as promoting healing of inflamed dermal surfaces. The boiling of the stems and producing a decoction is a common was to produce witch-hazel extract.

4. Rose (*Rosa* sp.) is a woody perennial flowering plant in the family Rosaceae. Most species are native to Asia, and fewer species are native to Europe, North America and northwestern Africa. Many ornamental roses are cultivated for their fragrance for use in commercial perfumery, attractive or scented foliage, ornamental thorns or their showy fruit.

The inventor has discovered that extracts of *Rosa* sp., including, but not limited to, *Rose absolute: Rosa alba* L., *Rosa centifolia* L., *Rosa damascena Rosa gallica* L., and vars. of these species have several biological activities can be beneficial to skin, inflamed skin as well as promoting healing of inflamed dermal surfaces. Different portions of *Rosa* sp. can be used to obtain the corresponding extract which can be derived from any one of the rose components: rose essence, rose buds, rose flowers, rose fruit and rose leaves.

Given the high-grade concentration of botanic molecule constituents within the different portions of the rose components, the constituents can be synergenistically enhanced and so are extracted (so as to extract more of the constituent components and therefore a higher concentration) directly into complex materials to form a rich botanical extract. Enhancement of extraction is by using the complex extract (having a higher ionic concentration) which can be by extracting the rose's constituent components/constellation directly into the aloe/jojoba phases rather than via a solvent extraction. Enhancement to the skin can be from the aloe and jojoba having the rose extract constellation within.

C. Extraction Methods

A person of ordinary skill in the art would be able to isolate any one of the extracts identified above from parts of the corresponding plant by using any suitable method known in the art. In one non-limiting example, the plant (or any part of the plant such as the leaves, stems, bark, roots, fruit, flowers or flower buds, fruit, kernel, seeds, seed pods, sap, resin, whole plant, etc.) can be disrupted by mechanical means to obtain a puree. The puree can then be processed to be substantially free of impurities or undesired solids. The puree can then be poured into a shallow vessel and quickly exposed to low temperature, i.e., flash frozen, for example at −20° C. or lower, potentially under a vacuum for removal of water content (lyophilization).

In another non-limiting example, any part of the plant, as listed above, can be collected, disrupted by mechanical means, or not and dried. The dried material can be boiled, steeped, immersed or otherwise contacted with a viscus/solvent environment into which the oils, volatile organic compounds, and other naturally occurring chemical substances and essence can be extracted into the solvent environment. Thus, incorporating as many of the naturally occurring "constellation", i.e., oils, volatile organic compounds and other naturally occurring chemical substances found in the originating plant and/or its parts. The resultant extract can be used in the compositions of the present invention and provides the benefits of being a complete extract also referred to as a rich botanical extract.

In other aspects, aqueous, alcoholic, or oil-based extraction techniques, or combinations thereof, can be used on the whole plant or any part thereof supra to produce an extract. In such a process, the desired part(s) of the plant or the whole plant is crushed up (e.g., blender) and then subjected to a desired solvent (e.g., water, alcohol, water/alcohol, or oil-based solvents) to obtain the desired extract. The extract can then be stored in liquid form, lyophilized, or subject to further processing techniques (e.g., heating, cooling, etc.). Extraction processes are well-known to those having ordinary skill in the extract production field (e.g., maceration, infusion, percolation, digestion, decoction, hot continuous extraction, aqueous-alcoholic extract, concoction, counter current extract, microwave assisted extraction, ultrasound extraction, supercritical fluid extracts, etc.).

The additional extraction processes that can be employed in carrying out embodiments of the disclosed inventions are not to be construed as limiting. Other methods producing extractions, as are known to one of skill in the art, can also be used and are envisioned.

Rich Botanical Extraction

It is understood that the greater the ionic strength of a material the greater its solubility for another material. Water won't extract as much as a saline, sugar or a salt extraction solvent. When extracting Aloe juice into a solvent of increased ionic strength, one will obtain a higher level of the Aloe juice extract and it can already be combined into the desired solvent which can insure both compatibility and at a higher concentration of extract levels and having a greater continuum of extract constituents, i.e., the constellation.

At least one of the advantages for extracting directly into the desired solvent is the elimination of distillation, concentration, a separate extraction procedure, and a drying procedure in the manufacturing process. In contrast, standard manufacturing/extracting processes result in the loss of synergistic effects normally available if all botanic molecule constituents in the extract were present. Thus, applicant has found that when extracting into "impure" media there is an intrinsic gain of other active botanic molecules and the accompanying gain of the synergistic effects that can be realized when the full constellation of botanic molecules are present. This is in contrast to pure solvent extraction which will generally result in a more limited number of molecule compounds, a partial collective of the molecule constellation.

Therefore, Applicant's ability to produce and use rich botanic extracts by extracting the botanical materials into a rich medium/complex solvent that is an ionicly strong medium (for example, a solvent having a higher salt concentration) produces a rich botanical extract having many botanic molecular constituents with the resulting synergistic effects and properties.

Applicant has taken the approach of employing an inherently known but unused method of extraction. That is, utilizing the possibility of extracting each botanical herb or non-herb into an ionicly stronger, e.g., higher ionic, e.g., salt, concentration solvent. Such an extraction produces a rich botanical extraction. The non-obviousness of this approach can be inherently apparent given that, despite the size of the cosmetics industry and the attractiveness of natural products to consumers, as far as Applicant can determine and most surprising, such an extraction method has not previously been practiced or utilized in commercial cosmetic manufacturing. The resulting extracts utilized in the claimed compositions have a greater representation of the full constellation of botanic molecules within the botanic material complex.

The preparation of the constituents used in the formulations, compositions and resulting products offer a variety of benefits and ecologically advantageous properties. The disclosed and claimed compositions can be recognized as biodegradable and/or dispersible, coral reef friendly, free of artificial chemicals, ingredients and synthetic colors or fragrances, and having an essential absence of artificial preservatives, insecticides, and pesticides. The products have no parabens, phthalates, irritating sulfates or animal testing. The products can be essentially natural, organic, non-GMO, gluten-free, and can be produced in facilities free from processing of milk and tree nut products. Surprisingly, the simplicity of the formulations can facilitate personalization and customizing of the products to match an individual user's needs a reality. This can be accommodated, for example, in a compounding pharmacy setting.

The products are essentially hypoallergenic, non-comedogenic, non-acnegenic, water resistant and adherent, non-drying and moisturizing. Additionally, the products have been shown to be stable, safe and efficacious. They have extended shelf-life stability over an extensive temperature range, e.g., 20° C. to 40° C. and emulsion stability. The products safety includes microbial resistant even after frequent openings and product extractions by using naturally bactericidal and fungicidal ingredients. And, the efficacy has remained consistent for at least two years after initial opening/product removal.

D. Additives

Also envisioned are compositions having additional constituents such as an additive(s) to further enhance the properties, purposes and functions of the claimed compositions. The additive(s) can be for example, but not limited to, a suspended constituent, a constituent potentially separate from the emulsion or a constituent within the emulsion but may or may not take part in the formation of the base emulsion. In one aspect, the additive(s) can be added at any stage, either before, during or after emulsion formation. Additionally, it is possible for the additive(s) to be carried, inert, suspended in whole or in time-release formats, within the other phases. The additive constituent(s) can be in a variety of forms, including, but not limited to, a solid, liquid or gas either in isolation or in combinations with one or more phases or constituents of any phase prior, during or after emulsion formation. As an example, and not to be construed as limiting, it could be the inclusion of the additive Zinc oxide (ZnO) in the oil/non-polar phase prior to formation of the emulsion.

Additive(s) to a phase, combined phases, an emulsion and a base formula can include, but are not limited to, particulate minerals such as Zinc oxide (ZnO) and Titanium dioxide ($TiO_2$) for use as a UV-A and UV-B absorbers, Mica for reflective and refractive properties, Ferrous oxides (FeO) in red, yellow and black tints to add colorant to the base formula, retinol and retinoic acid, and gluten-free oatmeal, in the colloidal oatmeal form. The additive, colloidal oatmeal, can be made from gluten free oats, can be added just prior to or during formation of the emulsion.

Zinc oxide (ZnO) and Titanium dioxide ($TiO_2$), in micronized form i.e., larger than nanometer-particle sized powders, each provide protection against sunlight radiation. Both are regarded as GRAS (generally recognized as safe) by the food industry. Additionally, neither has been found to be adverse or have detrimental effects on aquatic ecosystems.

The ferrous oxides, as additives, can impart a red, yellow or black color and are FDA-approved pigments for cosmetic use. As an additive in the disclosed compositions ferrous oxides, either in isolation and/or in combinations with one another, can be used to tint the color of the disclosed compositions to e.g., mimic the skin tone of the user. Ground Mica can be an additive in the disclosed compositions to impart reflective and refractive properties to eye shadows, lipsticks, blushes and lotions.

The use of non-gluten/gluten-free oatmeal can be used in the base formulation for Eczema plagued patients. Eczema sufferers can have contact dermatitis reactions to non-gluten-free oatmeal which can be the result of cross-contamination of the colloidal oatmeal with gluten containing oatmeal that can occur at the source of oatmeal manufacturing or during processing. Colloidal oatmeal can also provide avenanthramide activities, including, but not limited to, anti-inflammatory as well as anti-itch and irritation relief and act as an antioxidant.

Both retinol and retinoic acid can be added to the claimed compositions for the treatment of acne and Keratosis pilaris.

E. Sunscreens and Irritation Calming Lotions

The sunscreen composition of the present invention can have a mixture of natural, organic constituents and inorganic/physical additives while remaining free of chemically-formulated, synthesized, UV absorption agent(s). Such a composition has remained elusive to one of skill in the art and prior to applicant's invention unknown in the fields of cosmetology or pharmacology.

Also disclosed is a post-sun exposure lotion lacking additive(s) and containing Calendula extract. As described supra Calendula, when incorporated into the basic base emulsion formula, supra, can be beneficial to inflamed skin/dermal surfaces.

Sunscreen products are regulated as a drug by the FDA under 21 CFR 352.10 and 352.20. Sunscreen products are predominantly formulated and targeted for use by the general population. Such commercial practices can disregard safety for those individuals which have skin sensitivities and/or are not healthy and with sensitivities to mass produced sunscreens.

There are currently 17 active UV filtering ingredients approved by the FDA for use in sunscreens. These UV filters fall into two broad categories: organic/chemical (as in organic chemistry compounds/formulations including, but not limited to, hydrocarbons and esters) and inorganic/physical. Most UV filters are organic: They form a thin, protective film on the surface of the skin and absorb the UV radiation before it penetrates the skin. The inorganic sunscreens are insoluble particles (including, but not limited to ZnO, $TiO_2$) that reflect UV away from the skin. The active ingredients in commercial and prescription sunscreen formulations can include, but are not limited to, Avobenzone, Oxybenzone, Octisalate, Homosalate and 13 others as listed in 21 CFR 352.10 and incorporated by reference herein.

In general, sunscreens can have a minimum SPF value 2 and block UV-A and UV-B radiation within the regulations. In addition, if "water resistance" is desired, the formulation must allow topical retention of the sunscreen for a prescribed period of time within a defined water situation, generally about 40 to 80 minutes which can include continuous or intermittent immersion. The sunscreen itself cannot photodegrade during this time period. Additionally, there are further desirable properties for sunscreen, wherein it is easy to apply, has a pleasing appearance and texture, non-comedogenic, and non-irritating for use, by a subject with either one-time or for daily lifetime use. The latter is of particular importance for the sensitive facial skin and for subjects with a more sensitive epidermis. Examples of sensitive subjects include, but are not limited to, children, the elderly, fair-skinned subjects, albinos, subjects with a compromised dermis and/or a compromised immune system. Generally, women have thinner and more sensitive skin than men. Furthermore, current recommendations in regions with consistent and/or higher UV exposures urge application of sunscreen daily as a lifetime-use constituent. Thus, it is desirable that the sunscreen be formulated so that it can be tolerable, and not induce an adverse effect with prolonged use.

Another cause of adverse UV-radiation effects can be medication causing a photoallergy or phototoxicity reaction as a side-effect to the subject receiving the medication. The former, upon UV exposure, causes a structural change in the drug, applied to the skin's surface, resulting in antibody production to the drug and triggering a sun-sensitivity reaction such as eczema-type rash. In the later sensitivity, the UV light is absorbed by the drug which releases it into the skin leading to cell death at the sun exposed areas of the subject's body. Common phototoxic medications are amiodarone, NSAIDS, and the tetracycline antibiotic family.

Chemical sunscreens, by design, absorb UV radiation and ultimately break down. However, degradation of the chemical compounds can produce free radicals such as reactive oxygen species (ROS). Free radicals are known for their skin-damaging properties. Thus, in avoiding the short-term impact, e.g., sunburn, there is a risk when topically applying a chemical sunscreen, of direct harm, such as skin aging, by use of a long-term skin aging agent, e.g., ROS. Numerous chemical compounds found in commercially marketed sunscreens can be causative of more detrimental than beneficial effects with either occasional or consistent use including, but not limited to, Avobenzone and Oxybenzone. These are skin aging chemical compounds which are purported to be causative agents of endocrine disruption and allergenic effects; Octisalate can be a possible allergen, Homosalate can be have environmental toxicity, and Octocrylene can be both a photosensitizer and free radical producer. Oxybenzone is known to be toxic to young coral, causing endocrine disruption, DNA damage and coral death as well as exacerbating coral bleaching which causes coral to reject symbiotic organisms and lose their color (BioNews, 27:3-6, 2016. http://www.dcnanature.net/wp-content/uploads/2016/10/BioNews27.pdf#page=4).

Beyond chemical sunscreens' possible effects on human health there is also a growing concern as to their impact on the environment, most notably in fragile water-based ecosystems such as coral reefs. Thus, a sunscreen that is environmentally friendly as well as not having adverse health effects on a subject's health fulfills an unmet need. The claimed sunscreen composition utilizes a larger particle size of Zinc oxide or Titanium oxide as the UV-radiation absorber, greater than a nanometer in size, which is believed to be biodispersed and neither Zinc oxide nor Titanium oxide has been found to harm coral reefs.

Minerally active sunscreens have particle size as a consideration, as the mineral particle surface itself is otherwise regarded as chemically inert, with its sunscreen effect resulting from imparting opacity to the applied sunscreen. Sufficient mineral particles must be incorporated into the sunscreen formulation and dispersed sufficiently to impart opaqueness to provide a sun screening effect.

F. Uses and Benefits of the Disclosed Compositions

The disclosed formulations and claimed compositions can be derived from emulsifying an Aqueous phase and an Oil phase. Such an emulsion can have individual, combinations and the addition of one or more aqueous extracts in the Aqueous phase as well as or combinations of emollients (oil carriers) 1. The addition of an additive(s) can further enhance the fields of use and properties of the claimed compositions.

In one aspect, disclosed is a topical treatment for sunburn avoidance by application of the disclosed formulations and claimed sunscreen compositions. The formulation has an Aloe aqueous phase and a Jojoba oil containing oil phase and about 10% to 20% wt. % particulate Zinc oxide mineral as the UV radiation absorbance, although Titanium oxide could also be used instead of or in combination with Zinc oxide. Additionally, Ferric oxide tints could be added to the sunscreen base.

2. In another aspect, disclosed is a topical treatment for treating sunburn in which the aqueous phase is a combination of Aloe and Calendula extracts as a basic base formulation. The resulting emulsion provides soothing of irritated tissues and burn relief as well as having anti-viral and anti-inflammatory properties, reduce inflammation, can aid in controlling bleeding and bluster avoidance and can aid in healing the burned skin/dermal layers.

3. In another aspect, disclosed is a topical treatment having as an additive constituent colloidal oatmeal for all the purposes (effects) which are allowed by the FDA under CFR Title 21 in the composition, including, but not limited to, skin protectant and skin irritation reduction effects. Both effects are of interest to persons with Eczema. Additionally, skin irritation reduction can be of interest to persons exposed to irritants including, but not limited to, insect bites and irritation-inducing vegetation such as poison ivy, poison oak, poison sumac. Skin protection effects are also of interest to persons who may naturally have more delicate skin including, but not limited to, infants, immune-compromised subjects, the sick, elderly, or subjects who may have had higher levels of skin exposure to irritants such as persons who wash their hands on a regular basis as a job requirement. For some of these groups with compromised skin and/or immune systems, it is desirable that the treatment is efficacious, and does not contain constituents which have an antithetical effect.

The further inclusion of colloidal oatmeal with the Calendula extract in the base formula produces a soothing, protecting and irritant-free product that can benefit subjects suffering from Eczema and eczema-like skin/dermal conditions.

4. The addition of Black tea extract to the Aloe aqueous phase and cod liver oil to the oil phase of the sunscreen basic base formulation (without Calendula extract) can produce a product which can be used as, for example, a facial night mask. The night mask offers a topical application rich in caffeine, tannins and Vitamin E. Caffeine can act as a circulatory stimulant and tannins can function as an astringent and Vitamin E can provide skin healing and soothing properties.

5. In a basic base emulsion formula when Black tea extract is the predominant aqueous carrier yields a Black tea lotion product which can act as a stimulant of circulation. Such a base can optionally have a small amount of an aqueous Rose extract and a small amount of cod liver oil as an additional emollient. The lotion can sooth inflamed skin and promote healing of inflamed dermal surfaces.

6. A Rose and Black tea emulsion absent cod liver oil can provide a topical soothing and circulation stimulatory product for a subject.

7. A basic base formulation using in the aqueous phase both Aloe and Rose extracts with only Sweet almond oil as the emollient can produce a Rose and Sweet almond lotion that can help to keep skin soft and supple and protect against signs of aging. Alternatively, similar results can be obtained by using a formulation which can be a combination of Sweet almond oil and Jojoba oil.

8. A basic base formulation using Witch hazel alone or in combination with one or both of an optional Calendula extract alone or with Comfrey extract or in combination with Aloe vera juice with or without Calendula and/or Comfrey extracts in the aqueous phase and Jojoba oil as the emollient can produce a product that can aid in healing injuries, skin irritation and/or superficial sun damage.

G. Processing and Packaging of the Claimed Compositions as Products

Packaging to maintain efficacy, safety and hale can be further considerations when formulating and manufacturing the claimed compositions. For example, a composition's material properties are considered during and following emulsification to allow placement of the claimed composition(s) within packaging that can allow for sterile and oxygen-excluding delivery and containment states of the finished product. Delivery can be in a hands-excluding manner, as in a tube or bottle that dispenses with squeezing. The dispensing container can eliminate wiping a finger into a jar or other container into/through the composition for delivery. Said fingers may be dirty, introduce environmental microorganism(s), and/or may populate the composition with effluvia, shed dermis, and/or microorganisms from the user. This can be particularly critical for persons with Eczema or other skin sores, where the skin may be broken, weeping, flaking, and/or infected.

Alternatively, the disclosed and claimed sunscreen formulations have incorporated anti-microbial constituents which can avail its packaging into ajar or container conducive to manual topical application by swiping a finger into the jar for product retrieval and delivery. Such a product, including, but not limited to a sunscreen product, can be marketed to a target population that would not be immuno-compromised or easily susceptible to infection.

The methods of making and processing the basic base formulation can also influence stability and development of microbial growth. Preparation according to Food Safety Preparation Guidelines supra, further averts the potential for introduction of microbial contaminants. Additionally, packaging in an oxygen-excluding/no-touch or using "airless" pumps can be utilized to further prevent microbial contaminants. The exclusion of oxygen is known to retard spoilage as well as prevent cross-contamination from the end user's fingers when used for removing product aliquots during routine application. Additionally, packaging into e.g., microcapsules or single or limited use volumes and use of sterilization techniques can also preclude contamination.

Additionally, the incorporation of a quenching process to aid in cooling following emulsion formation has been shown to preclude condensation forming on the interior walls of the product's container or on the surface of the product itself.

There are a number of methods of achieving these states. Processing and delivery methods can include, but are not limited to, i) sterilizable—methods of sterilization can include but are not limited to; gamma radiation for most containers, pasteurization, HPP (high pressure process), ii) delivery in an oxygen-excluding manner. Oxygen excluding methods can include but are not limited to; vacuum pump action, or soft bags held within an exterior hard container, which become smaller as they empty, and so forth. The advantage of the softer, collapsible bags is that they can allow for the HPP manner of sterilization and, iii) delivery through some form of pump which can be compatible with i) and ii).

The disclosed compositions can be formulated such that they can be of a viscosity which can be packaged, dispensed and delivered by these methods and others as would be known to the skilled artisan.

H. Maladies and the Claimed Compositions

The claimed compositions can provide at least one or more pharmaceutical effects that can be either preventive/inhibitory, therapeutic and/or treatment for an illness, disease or irritation. Additives such as Zinc oxides or Titanium oxide can absorb UV-A and UV-B radiation as well as contribute to the rheology of the finished emulsion product. Tinting with ferrous oxides the disclosed compositions and products can provide a cosmetic effect which can further positively enhance a subject's personal perceptions and feelings of well-being. Additionally, the avenanthramide activities of relieving symptoms of inflammation, itchiness and irritation of the skin and dermis of a subject so plagued by one or more symptoms are additional benefits of including colloidal oatmeal as a constituent. The disclosed emollients can assist with topical moisturizing, soothing, smoothing, age-reducing and wrinkle reducing of topical surfaces as well as preventing UV-radiation penetration. Also, the disclosed compositions can be at least one of non-acnegenic, non-comedogenic, hypoallergenic, and easily adherent. And, when topically applied can be mild, soothing, non-irritating, quick drying, non-sticky, and non-drying of the skin/dermal surface of the subject.

The claimed compositions can also be used for treating, inhibiting or ameliorating at least one skin disorder and/or irritation selected from the group consisting of sunburn, dermatitis, eczema, seborrhea, psoriasis, xeroderma, and ichthyosis. The compositions have an essential absence of one or more skin irritants, supra, alcohols, and chemically-formulated constituents including, but not limited to fertilizers, pesticides, thickeners, stabilizers, buffers, anti-microbials, artificial preservatives, and artificial additives.

Irritants of the skin/dermal surfaces can include, but are not limited to, alcohols, organically synthesized chemical sunscreen compounds supra, soaps, detergents, highly basic or acidic solutions, plant excretions that can cause a rash, itch or other topical malady, allergens to materials such as wool, latex, adhesives, pharmaceuticals and so on.

The disclosed compositions can be made from organically grown, natural ingredients and minerals. This provides for products that can be bio-dispersed, biodegraded or otherwise decompose when introduced into the environment either through, for example, swimming, sweating, contact with flora, as well as disposed of in a waste receptacle, recycling of the packaging in which it was contained, buried in a landfill or in an aqueous environment, and so on.

Subjects who can benefit from the claimed compositions include animals with a skin/dermal surface. Animals include, but are not limited to, a human, horse, dog, cat, domestic pig, whale, porpoise, dolphin, hippopotamus, giraffe, elephant, and sheep. Also envisioned are animals within a zoological park, nature preserve, farm yard animals, domestic livestock and pets as is known to the skilled artisan. Each of the listed animals can suffer from sunburn and depending upon their living environment and sunlight exposure they can be more susceptible to UV radiation exposure. Animals living in a zoological park, aquatic park, freshly shorn, or albino and/or fair pigmentation, hairless skin as well as animals having white hair, feathers or fur, and animals absent shade or enclosures to avoid sunlight exposure would benefit from the topical application of the claimed compositions, including, but not limited to, sunscreen and after sun lotions, creams and gels made from the emulsions of the disclosed invention.

The topical application of a pharmaceutical formulation used in the inhibition, treatment and/or amelioration of a skin disorder or condition can comprise applying one or more of the claimed compositions. A cosmetic formulation can be used to inhibit, provide relief, and/or ameliorate a skin condition including, but not limited to, obscuring wrinkles, concealing skin discolorations or imperfections, relieve dryness, the signs of aging, and positively enhance a subject's personal perceptions and feelings of well-being when topically applying one or more of the claimed compositions.

Kits can provide the claimed compositions in containers or packaging to maintain or improve skin health including, but is not limited to, moisturizing, soothing, smoothing, inhibiting, treating, and/or ameliorating a skin/dermal disorder and/or irritation. The claimed compositions within a kit can be used within or in conjunction with a pharmaceutical formulation or as a pharmaceutical for use in the inhibition, treatment and/or amelioration of a skin disorder or condition.

The claimed compositions within a kit can be used within or in conjunction with a cosmetic formulation or as a cosmetic for use to inhibit, provide relief, and/or ameliorate or obscure wrinkles, conceal skin discolorations or imperfections, dryness, the signs of aging, and positively enhance a subject's personal perceptions and feelings of well-being.

The claimed compositions can be provided in a unit dosage form having a therapeutically effective amount of at least one or more of the claimed compositions. The unit dosage can provide a single dose of the claimed composition(s) for topical application as a therapeutic for the inhibition, treatment or amelioration of a skin disorder or condition. The therapeutically effective amount can treat a skin disorder in a subject such that treating effectively destroys all or a portion of the skin disorder.

The claimed compositions can provide the user of the composition(s) one or more of the following sensations and reliefs after application to the subject's skin: mild, non-irritating, quick drying, non-sticky, and non-drying, non-acnegenic, non-comedogenic or causative of inflammatory reaction.

The claimed compositions can be provided in a unit use form having a cosmetically appropriate amount of at least one or more of the claimed compositions. The unit use can provide a single use amount of the claimed composition(s) for topical application for use to inhibit, provide relief, and/or ameliorate or obscure wrinkles, conceal skin discolorations, imperfections, and/or the signs of aging, relieve dryness, and positively enhance a subject's personal perceptions and feelings of well-being.

The claimed compositions can originate from a basic base emulsion formula. The emulsified composition can include, but is not limited to, an: oil-in-water emulsion, oil-in-water-in-oil emulsion, a water-in-oil emulsion and a water-in-oil-in-water emulsion. The compositions can be produced in the form of at least one of a lotion, a liquid, a foam, a gel, a spray, a solution, and a cream. The produced emulsified compositions can be a topical formulation and can have a form including, but not limited to a: lotion, liquid, solution, gel, ointment, patch, paste, liquid, foam, mousse, spray, aerosol, triple emulsion, nanoemulsion, microemulsion, hydrogel, jelly, dispersion, suspension, solution, cream and a tape.

I. Demonstrated Stability of Disclosed Formulations

The inventor has established and defined criteria by which each disclosed composition can be formulated and evaluated for physical properties, efficacy and ability to function as designed. These have been delineated as the Aspects of Stability. "Stability" for a topical composition of the disclosed formulation(s) has a number of aspects. Aspect 1: Retention of any named effects, without undue degradation of the active constituent(s). Aspect 2: Lack of degradation of any constituent(s) into a toxic by-product. Aspect 3: Photostability within the provided container. Aspect 4: Thermal resistance—maintenance of physical state (e.g., solid, semi-solid, gel, liquid, etc.) without visible separation, liquefaction, etc. within a given temperature range. Aspect 5: Resistance to putrefaction. Aspect 6: Resistance to colonization by microorganisms including, but not limited to, pathogenic, allergenic and deleterious organisms. Additionally, the claimed composition(s) of the disclosed formulation(s) must comply with sterility and endotoxin limits as given in 21 CFR with regard to manufacturing, packaging and handling specifications.

There are two major cases where these Aspects can be applied: a.) Closed-container stability, or the length of time wherein a product satisfies these Aspects when the container is unopened from its final packaging and container integrity is uncompromised; and b.) Open-container stability, or the length of time wherein a product satisfies these Aspects once the container has been opened to the degree necessary to access product and which may involve removal of for example, but not limited to, foil seals, shrink wrap, and the like. In this latter Case, there is generally much greater exposure to the environment allowing for the possibility of: oxygenation, contact with airborne or finger-borne microorganism(s) depending on packaging, and so forth. The microorganism resistance needed in this latter case may be much greater and the open-container stability can be concomitantly shorter in general in Case b.) than in Case a.).

Storage conditions for the two Cases may or may not be different. To illustrate, but not to be construed as limiting, an opened lotion can be stable for at least six months and in the unopened state for up to two years at e.g., room temperature. Likewise, an unopened container can be stable for many months to a few years but could be refrigerated after opening to maintain each Aspect.

Many of the formulations of the claimed compositions disclosed herein have demonstrated stability in all Aspects. Example 1, infra, provides stability testing for the claimed emulsion lotion formulated into a sunscreen.

J. Compositions of the Disclosed Invention

1. Combinations and Amounts of Constituents

It is contemplated that the compositions of the present invention can include an extract of Aloe (*Aloe vera*), Calendula/Marigold (*Calendula officinalis*), Chamomile (*Matricaria chaomilla*), Comfrey (*Symphytum officinale*), Rose (*Rosa* sp.), Black tea (*Camellia sinensis* var. *sinensis* or var. *assamica*), Healing herbal extract (including, but not limited to, at least two selected from whole Marigold flowers, whole Chamomile flowers, Comfrey leaf and Comfrey root powder), witch hazel (*Hamamelis* sp., including, but not limited to, *Hamamelis virginiana*), herbs from the family Lamiaceae, including, but not limited to, basil, hyssop, lavender, marjoram, mint, oregano, *perilla*, rosemary, sage, savory, and thyme using at least 1, 2, 3, 4, 5, 6, 7, 8, 9, 10, 11, 12, 13, 14, 15, 16, 17, 18, 19, 20 and 21 herb and non-herb extracts either in isolation and/or in combination with one another. The compositions can also include additional components and additives described throughout this specification. The concentrations of a botanic extract(s), rich botanic extract(s) and/or additional components and/or additive(s) can vary. In non-limiting embodiments, for example, the compositions can include in their final form, for example, at least about 0.0001%, 0.0002%, 0.0003%, 0.0004%, 0.0005%, 0.0006%, 0.0007%, 0.0008%, 0.0009%, 0.0010%, 0.0011%, 0.0012%, 0.0013%, 0.0014%, 0.0015%, 0.0016%, 0.0017%, 0.0018%, 0.0019%, 0.0020%, 0.0021%, 0.0022%, 0.0023%, 0.0024%, 0.0025%, 0.0026%, 0.0027%, 0.0028%, 0.0029%, 0.0030%, 0.0031%, 0.0032%, 0.0033%, 0.0034%, 0.0035%, 0.0036%, 0.0037%, 0.0038%, 0.0039%, 0.0040%, 0.0041%, 0.0042%, 0.0043%, 0.0044%, 0.0045%, 0.0046%, 0.0047%, 0.0048%, 0.0049%, 0.0050%, 0.0051%, 0.0052%, 0.0053%, 0.0054%, 0.0055%, 0.0056%, 0.0057%, 0.0058%, 0.0059%, 0.0060%, 0.0061%, 0.0062%, 0.0063%, 0.0064%, 0.0065%, 0.0066%, 0.0067%, 0.0068%, 0.0069%, 0.0070%, 0.0071%, 0.0072%, 0.0073%, 0.0074%, 0.0075%, 0.0076%, 0.0077%, 0.0078%, 0.0079%, 0.0080%, 0.0081%, 0.0082%, 0.0083%, 0.0084%, 0.0085%, 0.0086%, 0.0087%, 0.0088%, 0.0089%, 0.0090%, 0.0091%, 0.0092%, 0.0093%, 0.0094%, 0.0095%, 0.0096%, 0.0097%, 0.0098%, 0.0099%, 0.0100%, 0.0200%, 0.0250%, 0.0275%, 0.0300%, 0.0325%, 0.0350%, 0.0375%, 0.0400%, 0.0425%, 0.0450%, 0.0475%, 0.0500%, 0.0525%, 0.0550%, 0.0575%, 0.0600%, 0.0625%, 0.0650%, 0.0675%, 0.0700%, 0.0725%, 0.0750%, 0.0775%, 0.0800%, 0.0825%, 0.0850%, 0.0875%, 0.0900%, 0.0925%, 0.0950%, 0.0975%, 0.1000%, 0.1250%, 0.1500%, 0.1750%, 0.2000%, 0.2250%, 0.2500%, 0.2750%, 0.3000%, 0.3250%, 0.3500%, 0.3750%, 0.4000%, 0.4250%, 0.4500%, 0.4750%, 0.5000%, 0.5250%, 0.550%, 0.5750%, 0.6000%, 0.6250%, 0.6500%, 0.6750%, 0.7000%, 0.7250%, 0.7500%, 0.7750%, 0.8000%, 0.8250%, 0.8500%, 0.8750%, 0.9000%, 0.9250%, 0.9500%, 0.9750%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, or 99% or more, or any range or integer derivable therein, of at least one of the botanic extracts, rich botanic extracts and/or additional components and/or additive(s) identified in this specification in isolation and/or in any combination with one another. In non-limiting aspects, the percentage of such ingredients can be calculated by weight, weight percent of the total composition amount (wt. %) or volume of the total weight of the compositions. The concentrations can vary depending on the desired effect of the compositions or on the product into which the compositions are incorporated.

2. Composition Vehicles

The compositions of the disclosed invention can be formulated into all types of vehicles. Non-limiting examples of suitable vehicles include emulsions (e.g., oil-in-water, water-in-oil, water-in-oil-in-water, oil-in-water-in-oil). The final emulsion can be manufactured as creams, lotions, solutions (both aqueous and hydro-alcoholic), anhydrous bases (such as lipsticks and powders), gels, ointments, pastes, milks, liquids, aerosols, solid forms, or eye jellies. Variations and other appropriate vehicles will be apparent to the skilled artisan and are appropriate for use in the disclosed invention. In certain aspects, the concentrations and combinations of the ingredients can be selected in such a way that the combinations can be one or more of: stably combined, mutually compatible and chemically compatible/soluble and absent formation of complexes that can precipitate from the finished product.

K. Personal Hygiene & Health Maintenance Products

Compositions used as personal care products and cosmetics are also contemplated. The phrase "personal care product" as used herein can include products for the maintenance of an individual's health including, but not limited to, skin care products for moisturizing and softening, and sunlight exposure protection (e.g., sunscreens). The personal care product compositions are formulated with constituents to prevent or minimize an allergic or similar untoward reaction when brought into contact with a subject's, e.g., a human's or animal's skin. Typically, such compositions are prepared for topical application as compositions or liquid solutions. The compositions can be prepared as emulsions. The emulsion can be further made into, e.g., suspensions and/or solid forms suitable for solubilizing or suspending in liquid prior to use. The finished products that can be, mists, lotions, creams, gels, supra.

Also contemplated are pharmaceutically-acceptable or pharmacologically-acceptable compositions. The phrase "pharmaceutically-acceptable" or "pharmacologically-acceptable" are used interchangeably and as used herein can refer to compositions which can have a medicinal property, and may not produce an allergic or similar untoward reaction when brought into contact with a subject's, e.g. human or animal, skin/dermal surface. Typically, such compositions are prepared for topical application as compositions or liquid solutions. The compositions can also be prepared as: emulsions, suspensions, solid forms suitable for solubilizing or suspending in liquid prior to use. Routes of administration can vary with the location and nature of the condition to be treated, and include, e.g., topical and nasal membranes.

L. Products

The compositions of the present invention can be incorporated into products. Non-limiting examples of products include personalized hygiene products, cosmetic products, etc. By way of example only, non-limiting cosmetic products include but are not limited to sunscreen products=pharmaceutical, moisturizing creams, skin, eye and face creams and lotions, softeners, day lotions, gels, ointments, foundations, face masks, night creams. Any of the aforementioned products can be applied to pre-moistened pads, swabs, wipes and washcloths. Also envisioned are baby products (e.g., baby lotions, oils, and wipes), and nasal rinses. Additionally, the products can be formulated as leave-on or rinse-off products. Products for use as anorectal products and the like are also envisioned.

M. Additional Constituents

Compositions of the disclosed invention can include additional constituents. Non-limiting examples of additional constituents include both fresh, organic/natural constituents for use in both personalized cosmetic and health compositions and health maintenance and beauty compositions.

1. Health and Beauty Composition Constituents

The United States Food and Drug Administration's "Guidance for Industry, Botanical Drug Products" (June 2004, http://www.fda.gov/downloads/drugs/guidancecompliance regulatoryinformation/guid ances/ucm070491.pdf), describes the manufacturing and product labeling for "Marketing a Botanical Drug Under an Over the Counter (OTC) Monograph" for a wide variety of non-limiting health and beauty constituents that can be used in the context of the present invention. Examples of these constituent classes include: Botanical drugs (http://www.fda.gov/AboutFDA/CentersOffices/OfficeofMedicalProductsandTobacco/CDER/ucm090983.htm). Numerous botanical drugs have an FDA approved Monograph as listed in http://www.fda.gov/downloads/aboutfda/centersoffices/officeofmedicalproductsandto bacco/cder/ucm135688.pdf. Non-limiting examples include, *Aloe vera* and Witch-hazel. The following provides specific non-limiting examples of some of the additional constituents that can be used with the compositions of the present invention.

i. Oils including, but not limited to, avocado, olive, macadamia, walnut, jojoba, sweet almond, almond, coconut, cod liver and the like, supra. The oils can be utilized as at least one of a carrier, emulsifier, antioxidant, emollient, and surfactant.

ii. Grains including, but not limited to, oats, kefir grains, rice, corn meal and the like. The grains can be used as a humectant, thickener, absorbent, exfoliant and the like.

iii. Flowers including, but not limited to, rose, lavender, orange, marigold, rosemary and the like. The flowers can be used in producing a rich botanical extract as well as an essential oil, a tincture, a distillate, a perfume, an extract, and the like.

iv. Botanicals including, but not limited to, aloe, witch hazel, tea (black, green, yellow or white), chamomile, comfrey, and the like, supra. The botanicals can provide therapeutic, healing, anti-bacterial, anti-inflammatory, anti-infective properties and the like.

v. Nuts including, but not limited to, almond, hazel, walnut and the like. The nuts can be further processed into a milk, an oil, ground, crushed or pureed. The nuts can be used as a facial or foot scrub, a thickener, an emollient and the like.

vi. Thickening agents can include, but are not limited to, agar-agar, Irish sea moss, cornstarch, flours, colloidal oatmeal and the like.

vii. Salts and Sugars can include, but are not limited to, sea salt, rock salt, molasses, brown sugar, white sugar, honey and the like.

viii. Inert materials can include, but are not limited to, clays, coffee grounds, seeds, minerals including, but not limited to, zinc oxide and ferrous oxides in black, red and yellow, titanium dioxide, and mica, and the like. The clays and metal oxides can be used to provide one or more of sun screening properties and/or coloring/tinting of topical creams and lotions either in isolation and/or in combinations with one another.

ix. Stabilizers can include, but are not limited to, lemon, citric acid, orange, a salt, a sugar and the like. The stabilizers can act as an example, but not limited to, antioxidants, buffers, and viscosifiers.

2. Pharmaceutical Constituents

Pharmaceutical constituents are considered as those materials used according to the U.S. FDA Monograph supra. Non-limiting examples of pharmaceutical constituents include agents used in compositions used for therapeutic, supra, healthy, alleviative and corrective affects for dermatological, inflammatory, and rosacea uses including, but not limited to, anti-inflammatory agents including non-steroidal anti-inflammatory drugs, antibiotics, anti-fungals, anti-virials, anti-bacterials, antiperspirants, antipruritics, antipsoriatic agents, antiseborrheic agents, biologically active proteins and peptides, burn treatment agents, cauterizing agents, depigmenting agents, diaper rash treatment agents, enzymes, hemostatics, kerotolytics, photosensitizing actives, skin protectant/barrier agents, sunburn treatment agents, sunscreens, transdermal actives, nasal actives, wound treatment agents, and wound healing agents.

N. Fields of Use

Disclosed herein are topical cosmetic and/or pharmaceutical compositions, methods of making the compositions and uses thereof. The claimed compositions, methods of making and using the disclosed compositions find applicability as products for uses including, but not limited to, biotherapeutics, cosmetics and sunscreens. Additionally, the products can assist with maintaining healthy skin, inhibiting and/or treating skin conditions and maladies as well as provide anti-microbial, anti-aging, anti-inflammatory, anti-itch, anti-oxidant, and anti-irritant properties that also can be soothing, smoothing, softening and moisturizing to a subject's skin and dermal surfaces.

In another embodiment, the disclosed composition products and methods of making and using the products can find application and use in a variety of fields. Fields include, but are not limited to, Cosmetology, Esthiology, medicine and health care in the specialties of Dermatology, Veterinary Medicine, Homeopathy, Osteopathy, Pharmacology, and holistic medicine approaches to the inhibition of diseases and inflammations and for use in pharmaceuticals and homeopathic therapeutics. Additionally, research into any of the listed and related fields can find disease and malady inhibition and therapeutic product improvements by employing the claimed compositions, methods of making and using the disclosed compositions and kits having the disclosed compositions.

O. Kits

Kits are also contemplated as being used in certain aspects of the present invention. For instance, a composition of the present invention can be included in a kit. A kit can include a container. Containers can include a bottle, a jar with a screw top or clamp lid, a laminate tube, a plastic tube, a dispenser used in an upright or in an inverted position depending on the composition and where it will be applied, a pressurized container, a barrier container, a package, and re-sealable packaging. Packaging for a cosmetic composition can include, but is not limited to, a compartment, a lipstick container, a compact container, a bottle, a jar, and cosmetic pans that can hold cosmetic compositions. Also envisioned can be containers such as injection or blow-molded plastic containers into which the dispersions or compositions or desired bottles, dispensers, or packages are retained. The kit and/or container can include indicia on its surface. The indicia, for example, can be a word, a phrase, an abbreviation, a picture, or a symbol.

The containers can dispense a pre-determined amount of a composition. The composition can be a lotion, a liquid, a foam, a gel, a spray, a solution, a cream, a frozen sheet, an emulsified composition in the form of a lotion, a cream, a gel, a solution, an oil-in-water emulsion, a water-in-oil emulsion, a gel, an ointment, a patch, a paste, a liquid, a foam, a mousse, a spray, an aerosol, a triple emulsion, a nanoemulsion, a microemulsion, a hydrogel, a jelly, a dispersion, a suspension, and a tape.

In other embodiments, the container can be squeezed (e.g., a bottle, or plastic tube) to dispense a desired amount of the composition. The composition can be dispensed as a mist, spray, foam, a liquid, a fluid, a lotion, or a semi-solid. The containers can have spray, pump, or squeeze mechanisms. A kit can also include instructions for using the composition(s) provided within the kit. Instructions can include an explanation of how to apply, use and store the composition(s).

Methods

The following methods are included to demonstrate certain non-limiting aspects of the disclosed invention. It should be appreciated by those of skill in the art that the techniques disclosed in the examples represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the disclosed invention.

Materials and Methods for Obtaining Extracts, Infusions and Distillates

Extracting the essential oil sourced from blossoms, fruit, roots, rhizome, leaves, stems, bark, whole plants, etc. from an herb, spice, nut, seed, tree, shrub, or flower can be done by pressing, expression, absorption, maceration, and alcohol-free and hydrophobic solvent-free extraction, infusions and distillation as known to one of skill in the art. The resulting extract, infusion and distillate can be purchased as a tincture, powder or liquid.

Herbal Extract:

Comfrey is exemplified but other herbs are similarly processed as is known to one of skill in the art. Following rinsing the herb of dirt, carefully remove Comfrey leaves from stem (rhizome or roots could also be used) and crush or chop the leaves finely and transfer to a container that can be sealed e.g., with aluminum foil or a sealing lid. Pour boiling water over the chopped leaves and cover with the foil to trap volatiles and let stand for about two hours. It is noted that sealants and steeping times will vary depending on the amount of leaves and container size. After standing carefully lift off the foil and return any condensate on the foil into the container. This method can be used for herbs from the Lamiaceae family as well as rose petals, Calendula (marigold) and chamomile flowers, as well as with Chamomile Tea and Black Tea bags.

Method 1

Composition and Method of Making a Base Formula/Lotion

Combine the aqueous phase constituents. The constituents comprise about 25.5-47.4 wt. % of at least one aqueous carrier. The carrier can include, but is not limited to, aloe vera juice, Black tea extract and Rose extract, sterile water, and other aqueous liquids, excipients and derivatives and combinations thereof as are known to one of skill in the art. The aqueous phase can also have about 2.6-2.9 wt. % humectant e.g., glycerine, and about 1.40-1.53 wt. % of a first emulsification agent e.g., borax and can optionally have at least one botanical extract(s) in a range of about 0.0-47.4 wt. %. Cover and heat the aqueous phase constituents to about 78° C.-84° C. with or without stirring until dissolved. Heating can be by water bath immersion, an external jacket, an internal coil, etc.

Combine the oil phase constituents. The constituents comprise about 30.3-33.5 wt. % of at least one emollient, e.g., a vegetable or animal oil. The emollient can include, but is not limited to, a constituent of one or more of Jojoba oil, Sweet Almond oil, Castor oil, Coconut oil and Cod Liver oil and derivatives and combinations thereof; about 11.3-12.5 wt. % of a surfactant such as e.g., Coconut oil and a second emulsification agent, about 6.01-6.71 wt. % e.g., Beeswax, Carnauba wax and/or Coconut oil. Cover and heat to about 78° C.-84° C. with or without stirring until the constituents are melted and miscible.

Once the aqueous and oil phases' constituents have dissolved and melted, respectively, with or without mixing, simultaneously cool both phases to very similar ambient temperatures. Combine the aqueous and oil phases with mixing until a stable emulsion (e.g., water-in-oil) forms as is known to one of skill in the art. Optionally, an additive(s) can be slowly added following completion of addition of the aqueous phase to the oil phase as well as during and/or after formation of the emulsion. The resulting stable emulsion yields simplistic compositions which can be at least one of protective, non-irritating, stable, and environmentally friendly and combinations thereof, can serve as a base formula to produce for example, but not limited to, a cream, a lotion, a gel as is known to a skilled artisan, having an essential absence of artificial and/or chemically-formulated constituent(s) and additive(s).

| Basic base formula: | | wt. % |
| --- | --- | --- |
| Aloe vera juice | 150 ml | 27.4 |
| Calendula extract | 100 ml (optional) | 18.2 |
| Glycerine | 15 ml | 2.7 |
| borax | 8 gm | 1.5 |
| Jojoba oil | 175 ml | 31.9 |

-continued

| Basic base formula: | | wt. % |
|---|---|---|
| Coconut oil | 65 gm | 11.9 |
| Beeswax | 35 gm | 6.4 |
| Total: | 548.0 | 100.0 wt. % |

The above basic base formula with the Calendula extract can provide relief from sunburn and when supplemented with an additive, e.g., about 60 gm Colloidal oatmeal can provide a product for subjects suffering from e.g., Eczema.

Alternatively, the absence of a botanical extract and using about 250 ml of Aloe vera juice in the above basic base formula can produce a 10% sunscreen product with addition of about 60.0 gm of a UV-absorbent, e.g., ZnO. There can also be the addition of about 5.0 gm of one or more ferrous oxide(s) to tint the sunscreen.

Method 2

Sunscreen Lotion, 8%-40% Zinc Oxide, with or without Tinting

An 8%-40% Sunscreen Lotion can be made according to Method 1. There can be about 43.8-47.4 wt. % aqueous carrier which can be Aloe vera juice in the aqueous phase and the aqueous phase can further comprises about 2.6-2.9 wt. % glycerine as the humectant, and about 1.40-1.53 wt. % borax as the first emulsification agent, and about 30.3-33.5 wt. % Jojoba oil, about 11.3-12.5 wt. % Coconut oil as surfactant, and about 6.01-6.71 wt. % Beeswax, second emulsification agent and further comprises 0.1-25.0 wt. % (50.0-70.0) g Zinc oxide as an additive. If tinting is desired, about 0.1-2.0 wt. % tinting additive can be added as a wt. % of the total composition adding slowly following completion of addition of the aqueous phase to the oil phase while maintaining mixing but prior to completion of formation of a stable emulsion. The tinting additive can be a mineral including, but not limited to, Red Ferrous oxide, Yellow Ferrous oxide and Black Ferrous oxide and Mica either in isolation and/or in combinations with one another. The formulation has an essential absence of artificial and/or chemically-formulated constituent(s) and additive(s).

Method 3

Afterburn Sunburn Lotion

The Afterburn Lotion can be made according to Method 1. There can be about 25.5-29.2 wt. % aqueous carrier which can be Aloe vera juice and the aqueous phase can further comprise about 16.4-20.1 wt. % Calendula botanical extract and an essential absence of artificial and/or chemically-formulated constituent(s) and additive(s).

Method 4

Eczema Lotion

The Eczema Lotion can be made according to Method 3. The lotion further comprises as a wt. % of the total composition about 0.1 wt. % to about 15.0 wt. % colloidal oatmeal additive and optionally colloidal oatmeal as an additive which can be added slowly following completion of addition of the aqueous phase to the oil phase while maintain mixing but prior to completion of formation of a stable emulsion.

Method 5

Fine Line Minimizer, Night-Time Mask

A Night-time Mask Lotion that works to minimize fine lines can be made according to Method 1. There can be about 16.4-20.1 wt. % aqueous carrier which can be Aloe vera juice plus about 25.5-29.2 wt. % Black Tea extract, about 2.6-2.9 wt. % glycerine as a surfactant and about 1.40-1.53 wt. % borax as the first emulsification agent in the aqueous phase and an oil phase having about 16.4-20.1 wt. % Jojoba oil, plus 12.8-14.6 wt. % cod liver oil as emollients, about 11.3-12.5 wt. % Coconut oil as a surfactant, and about 6.01-6.71 wt. % Beeswax as the second emulsification agent and an essential absence of artificial and/or chemically-formulated constituent(s) and additive(s).

Method 6

Black Tea Lotion for Stimulating Circulation

A Black Tea Lotion that works to stimulate circulation can be made according to Method 1. There can be about 32.0-39.0 wt. % Black Tea extract in place of the Aloe vera juice, about 7.00-11.0 wt. % Rose extract, 2.6-2.9 wt. % glycerine and about 1.40-1.53 wt. % borax in the aqueous phase and an oil phase having about 25.5-29.2 wt. % Jojoba oil, plus about 2.7-6.4 wt. % Cod liver oil, about 11.3-12.5 wt. % coconut oil and about 6.01-6.71 wt. % beeswax in the oil phase and an essential absence of artificial and/or chemically-formulated constituent(s) and additive(s).

Method 7

Black Tea and Rose Lotion

A Black Tea and Rose Lotion that works to stimulate circulation and healing while soothing the skin can be made according to Method 6. There can be about 25.5-29.2 wt. % Black Tea extract, about 16.4-20.1 wt. % Rose extract, 2.6-2.9 wt. % glycerine and about 1.40-1.53 wt. % borax in the aqueous phase and an oil phase having about 30.3-33.5 wt. % Jojoba oil, an absence of Cod liver oil, about 11.3-12.5 wt. % coconut oil and about 6.01-6.71 wt. %, beeswax in the oil phase and an essential absence of artificial and/or chemically-formulated constituent(s) and additive(s).

Method 8

Rose and Sweet Almond Lotion

A Rose and Sweet Almond Lotion that can be soothing to the skin can be made according to Method 1. There can be about 25.5-29.2 wt. % Aloe vera extract plus about 16.4-20.1 wt. % Rose extract, 2.6-2.9 wt. % glycerine and about 1.40-1.53 wt. % borax in the aqueous phase and an oil phase having about 30.3-33.5 wt. % Sweet Almond oil, about 11.3-12.5 wt. % coconut oil and about 6.01-6.71 wt. % beeswax in the oil phase and an essential absence of artificial and/or chemically-formulated constituent(s) and additive(s).

Method 9

Witch Hazel and Marigold Lotion

A Witch Hazel and Marigold Lotion that can assist in injury recovery and skin healing can be made according to Method 3. There can be about 25.5-29.2 wt. % witch hazel, about 16.4-20.1 wt. % Calendula (marigold) extract, about 2.6-2.9 wt. % glycerine and about 1.40-1.53 wt. % borax in the aqueous phase and an oil phase having about 30.3-33.5 wt. % Jojoba oil, about 11.3-12.5 wt. % coconut oil and about 6.01-6.71 wt. % beeswax. Optionally, there can be at least one of: i.) only Calendula extract, ii.) a mixture of Comfrey extract and Calendula extract present in a ratio of 50:50 when co-extracted together, and iii.) both Comfrey extract and Calendula extract, each as separate extracts, in combination with Witch Hazel to comprise the aqueous phase. When present, the Comfrey can comprise from 0-150 ml (0-60 wt. % of the aqueous phase) though at the higher volumes it could likely be co-extracted with the Calendula. Each of the Calendula and Comfrey can be extracted directly into the Witch hazel in which case the Witch hazel could comprise up to 250 ml or all of the aqueous phase, while if not used for extraction, the Witch hazel could comprise from 0-100 ml (0.0-40 wt. %) of the aqueous phase and an essential absence of artificial and/or chemically-formulated constituent(s) and additive(s).

EXAMPLES

The following examples are included to demonstrate certain non-limiting aspects of the disclosed invention. It should be appreciated by those of skill in the art that the techniques disclosed in the examples represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the disclosed invention.

Example 1

Microbial Inhibition in a Personal Care Preparation

To evaluate anti-microbial properties, tested formulas included the base formula (Method 1), 10% borax solution, Aloe Lotion (Method 3), and Sunscreen with 10% ZnO (Method 2). Each formulation was applied to each side of a dual-sided microbial-test agar microslide (P/N EQP-MI-CROB-02, Microbiological Test Kit, MakingCosmetics®, Snoqualmie, WA) with modifications to manufacturer's directions.

Figure 1B:
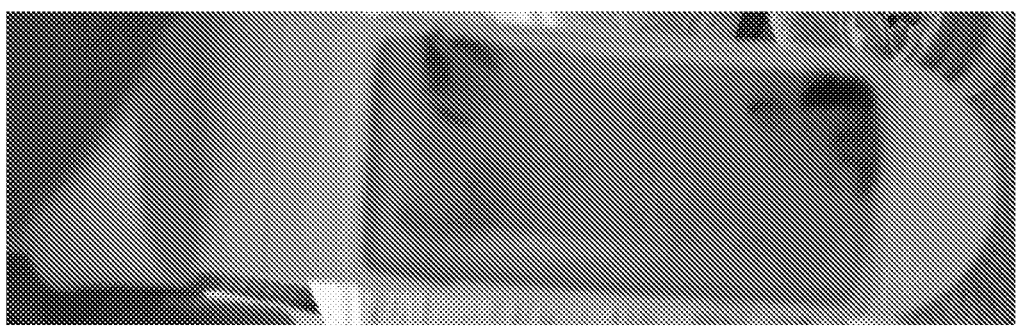
FIG. 1B depicts the opposite side of the microslide of FIG. 1A inoculated with white mycelia.

Each side of a slide was divided into four quadrants, two top and two lower. The lower quadrants of each side were first smeared with a test formula followed by inoculation with an unidentified green mycelia (FIG. 1A) and the second side of the slide with an unidentified white mycelia (FIG. 1B) at the slide's top left (mycelia growth positive control) and overlaid atop the test formula in the lower quadrants while the top left remained mycelia free and served as a negative control. The two mycelia inoculum were each picked from two different environmental molds. The microslides were placed in vials and were evaluated after about 5-days to four weeks incubation in darkness at room temperature for microbial growth or absence of growth in the areas where the test formula was applied. Resistance to or inhibition of microbial growth within each test formula's quadrants would be interpreted as exhibiting inhibition and/or resistant to microbial growth.

Figure 1C:
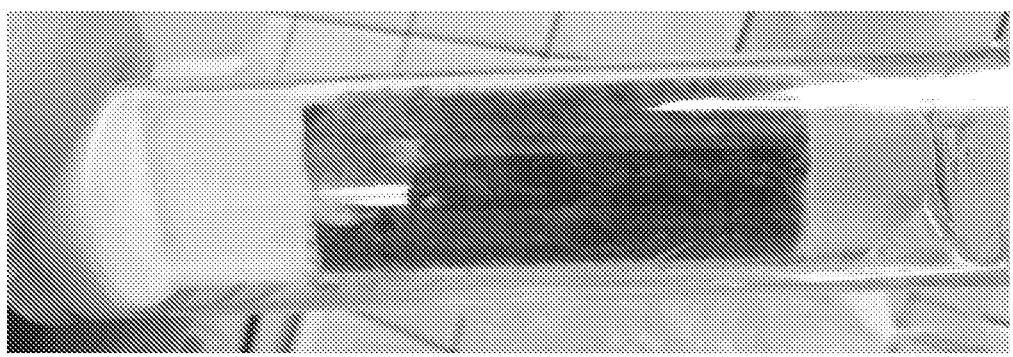
FIG. 1C depicts one side of the microslide inoculated with green mycelia overlaid atop an aqueous 10% borax solution after 4 weeks incubation.
Figure 1D:
FIG. 1D depicts one side of the microslide inoculated with green mycelia overlaid atop the disclosed sunscreen composition containing 10% Zn oxide after 4 weeks incubation.

FIG. 1C (10% borax solution) indicates no inhibition of mycelia growth while FIG. 1D (sunscreen having 10% ZnO) illustrate mold growth field curling away from the sunscreen in the lower quadrants four weeks post-inoculation indicating the sunscreen to be highly mold resistant. The basic base formula containing Aloe and Jojoba in a base lotion (Method 3) appears to have slightly slowed both white and green mycelia growth in the lower right quadrants after four weeks (data not shown).

Comparable results would be seen with application of the base formula to the lower quadrants followed by overlaying bacterial inoculum which would also be applied to the right left and lower quadrants of the TSA surface. The results would be seen as no or inhibited bacterial growth in the lower left quadrants indicating the base formula exhibits inhibited and/or resistance to bacterial growth.

The microslides provided conditioned agars to easily facilitate microbial growth. Thus, in all cases where 'mold mycelium inoculant' was introduced, it was expected that mold growth would be observed. The use of mycelia could assist in ease of mold growth and was employed to represent a "worst case scenario" of a potentially contaminated product which could result in the contaminated product easily facilitating further mold growth. Surprisingly, the testing serves to illustrate that the disclosed formulations and claimed compositions' have unique and natural microbial resistance properties simply by selecting naturally microbial resistant and/or inhibiting constituents and can support and eliminate the need for artificial preservatives and anti-microbial chemicals. Such testing was not to be interpreted as representative of normal use or sample storage conditions. The result of interest was the delta in mold growth rate, if any, between the top and bottom of the slide as the base formula was only applied in the lower quadrants.

It is noted that each of the molds used for testing fungal resistance were obtained following their spontaneous growth in an earlier test formulation identified as contaminated (data not shown). It is suspected, though not substantiated, that the molds utilized for inoculation could have arisen from contaminated water condensate present on the interior wall of the jar containing the test formula during formulation development. Thus, any resulting mold contamination could have originated with the condensate as the source of the mold rather than mold spores originating within the base formula and so the mold spores were introduced into the test formula before sealing resulting in entrapment of free-floating spores rather than resulting from mold growth on the test formula itself due to mold contamination during constituent incorporation.

The lack of mold formation strongly supports the anti-microbial properties of the base formula even though there is an essential absence of chemical-formulated preservatives and chemical anti-microbial additives within the formulation or in the finished product. Chemically-derived preservatives and anti-microbial additives are known to be irritating, harmful and environmentally polluting and can be essentially absent from the base formulation and claimed compositions.

Example 2

Real Time Stability in a Personal Care Preparation
Stability Testing of the Disclosed Sunscreen, Consistency and Contamination Resistance A stability study for both emulsion consistency and microbial growth resistance has been conducted for about two years, at room temperature, with samples placed in transparent containers exposed to ambient light, with frequent (e.g., almost daily) openings, lotion extractions using fingers and closings. The almost daily use of the sunscreen composition has exhibited no visible mold formation or break of the emulsion. Further, temperature fluctuations as would be found indoors, including seasonal cycling, ranging from 50° F. to up to 100° F. also had no adverse effect on the stability of the basic base formulation or derived formulations. No odor or emulsion breakdown was observed in the base or derived formulations (data not shown). These studies indicate that the disclosed formulations have emulsion/ rheology consistency and shelf stability, anti-microbial stability and mechanical stability of the lotion/base formula in a frequently opened container including frequent product removal. Additionally, shelf lives of at least two years have been observed in all formulations derived from the basic base formula, i.e., sunscreen, Rose lotion, tea lotion, Rose & tea lotion, oatmeal lotion, plain aloe lotion, etc.

Figure 2A:
FIG. 2A depicts a formulated sunscreen composition having about 10% Zinc oxide within an infrequently opened container during 28 months of stability testing, in one embodiment.
Figure 2B:
FIG. 2B depicts the opened container of FIG. 2A.

FIGS. 2A and 2B illustrate examples of open-container stability of emulsion consistency and microbial resistance for one formulation of the present innovation, i.e., Sunscreen for more than 28 months.

FIG. 2A depicts a closed glass jar having a clamp lid with rubber gasket containing a formulated sunscreen 28 months after packaging. The container was occasionally opened and sunscreen was removed about 8 times during the first 7 months with a clean metal implement and opened for observations approximately 15 times during the 28 months. The container was stored at ambient temperature, absent direct sunlight and subjected to erratic and occasionally inconsistent temperatures. Readily apparent is the uniformity of the emulsion with no observable discoloration, and/or separation which could indicate degradation or putrefaction.

FIG. 2B depicts an interior view of the container in FIG. 2A. Last sampled about 20 months after packaging. Clear lines in the formulation may be observed where samples have been removed with a metal implement indicating a consistently stable consistency. The clarity of these lines shows that the thermal cycling of the material has not caused loss of the emulsion (partial or total separation), or even sufficient softening to liquefy and eliminate these lines. Thus, after 28 months the skilled artisan would conclude that the disclosed sunscreen formulation maintained its uniformity, emulsion consistency and had no visible contamination, separation or discoloration and therefore, no degradation or putrefaction.

Stability Testing of the Disclosed Sunscreen, Shelf-Life

Figure 2C:
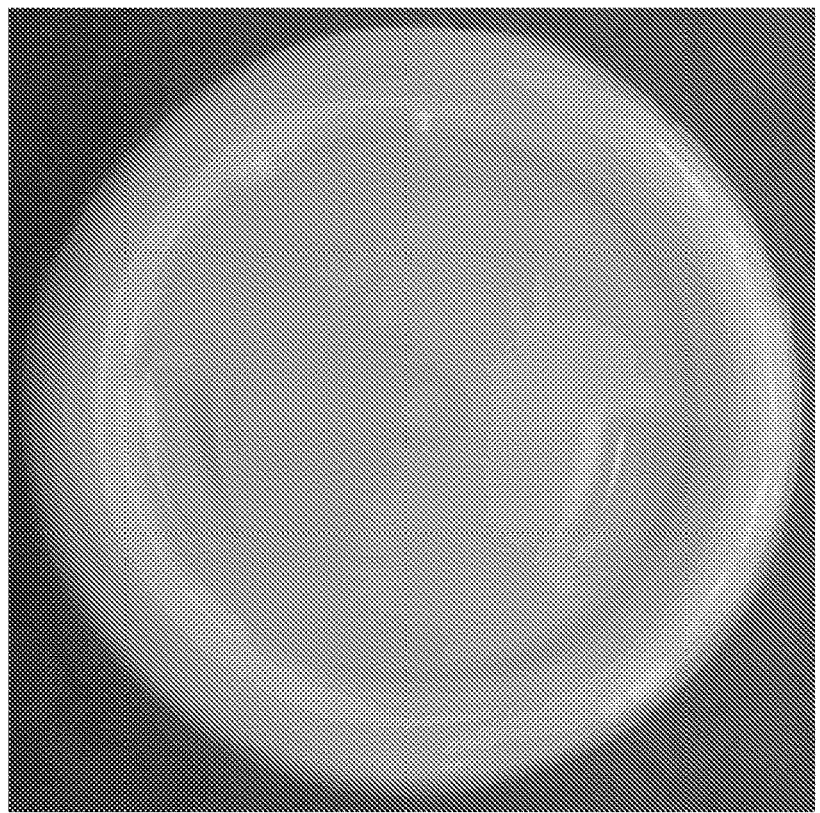
FIG. 2C illustrates emulsion stability of the sunscreen of FIG. 2A at ambient temperature without opening.
Figure 2D:
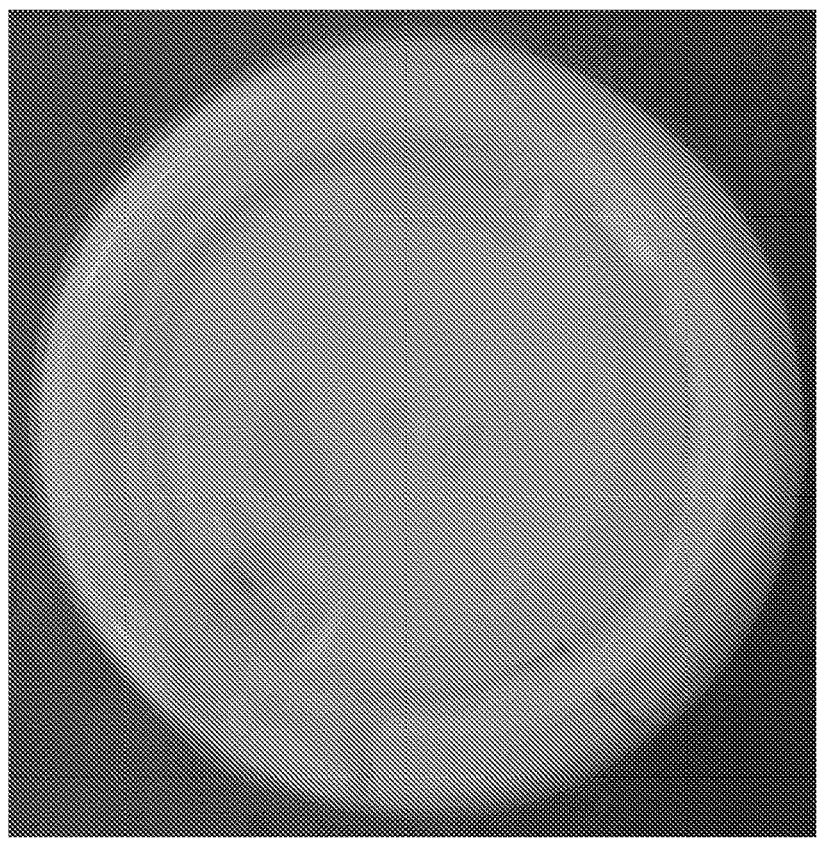
FIG. 2D illustrates aging simulation of the disclosed sunscreen from FIG. 2A which was placed at 40° C. for 24+ months without opening.

The disclosed sunscreen formula was placed in plastic jars using standard packaging methods employing a press-fit inner seal. Packaging did not involve shrink wrap, vacuum packaging, or post-sterilization methods. The jars were placed in a box at ambient temperature for 24+ months without opening. After 24 months eight days the sunscreen appeared homogenous indicating ongoing emulsion stability (FIG. 2C). To simulate aging of the sunscreen a second plastic jar, packaged identical to FIG. 2C was placed in the dark and is shown in FIG. 2D. 40° C. was chosen for accelerated aging vs. "normal use" at room temperature, 25° C. Additionally, 40° C. was determined to be a verifiable and tolerable limit for storage and use, at least for brief periods, such as may be encountered in an enclosed car in the sun, on the beach or siting on hot beach sand.

$$Q10^{(TAA-TRT)/10} \times \text{Accelerated aging time} = \text{Projected Real Time(RT)}$$

where TAA is accelerated aging temperature (e.g. 40° C.) and TRT is true real temperature (e.g. 25° C.), RT=desired real time=365, Q10=aging factor=1.8 to 2.5, typically 2. For the observed length of storage time at 40° C. of 2 years 8 days (RT), projected stability at 25° C. is 2087 days or 5.7 years. This duration of stability would more than exceed commercial distribution requirements.

Results: Minor mechanical cracking can be observed resulting from container expansion and contraction when removed at intervals for observation over the testing period. Nevertheless, the sunscreen appears homogenous and the emulsion appears stable and absent separation of phases despite prolonged exposure to extreme temperature (40° C.). It is also noted that the containers in both FIGS. 2C and 2D remained unopened during observations and thus, only visible aspects were evaluated. However, emulsions are clearly stable and neither separated, softened, nor appeared visibly contaminated.

This provides evidence of the claimed sunscreen compositions exhibiting stability and likely safety, something highly desirable yet seemingly elusive in the cosmetic and pharmaceutical industries without incorporation of chemical-formulated constituents. The chemically-formulated constituents can be, at the very least, irritating and at worst toxic, allergenic and/or comedogenic to the subject user's skin/dermal surface following topical application.

Example 3

Elimination of Crepey Skin with Colloidal Oatmeal Additive

To evaluate improvement in skin appearance following application of the base formula plus colloidal oatmeal additive (Eczema lotion, Method 4) was applied to the backs of a human subject's hands which exhibited a crepey (crinkled and/or puckered texture) appearance.

Figure 3A:
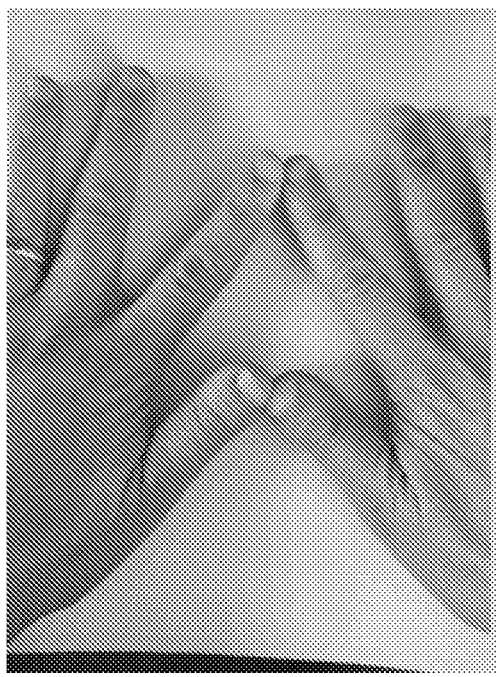
FIGS. 3A and 3B illustrate hands having a crepey appearance prior to application of the oatmeal lotion.
Figure 3B:
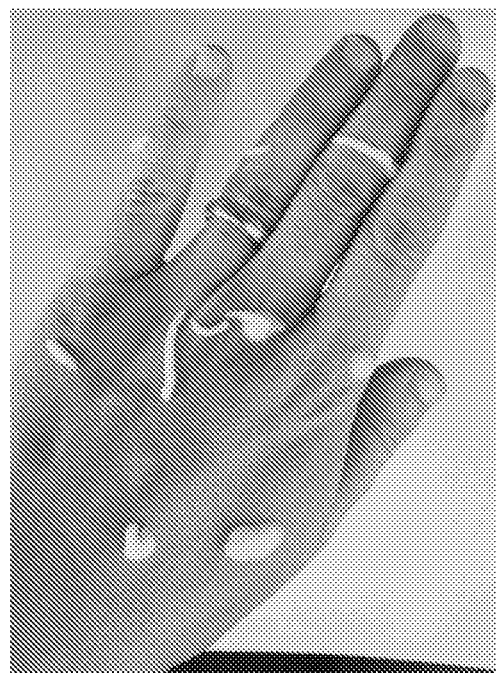
Figure 3C:
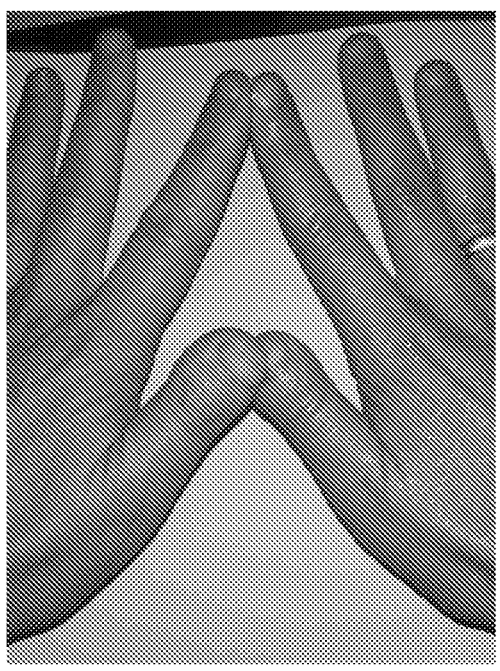
FIG. 3C depicts hands of FIGS. 3A and 3B post-application of oatmeal lotion.
Figure 3D:
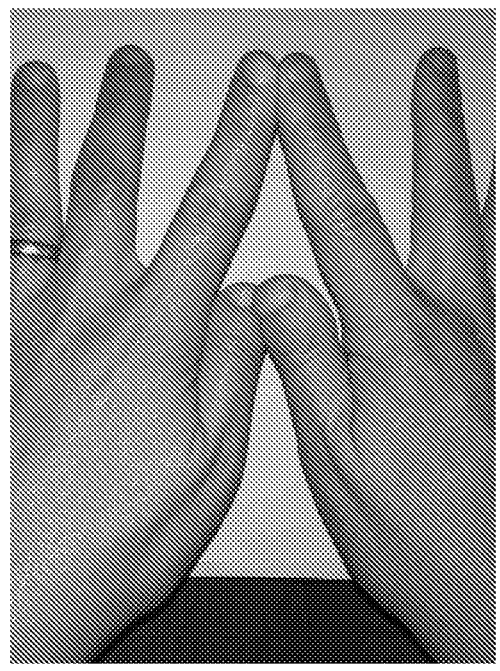
FIG. 3D: hands once again tensioned in same manner of FIG. 3A illustrating more of the back of the hand. The oatmeal lotion can be observed to have now "soaked into" the skin, giving a matte rather than shiny, but still soft and supple appearance.

FIGS. 3A-3D are a compilation of photos of a subject's hands before and after application of the Eczema lotion. The human subject's hands had a crepey appearance prior to application of the oatmeal lotion. FIG. 3A shows thumbs and index fingers were pressed together lightly tensioning the skin and hands to illustrate skin wrinkling and dryness. Major wrinkles could be observed between the knuckle of the index finger and the thumb on each hand, despite tensioning. Smaller wrinkles in these areas, and wrinkles along the back of the fingers, are also observed and were due to the inherent (dry) condition of the skin. Darker skin may be observed on the left hand's knuckles of the index and second finger relative to the coloration of the corresponding areas of the right hand (FIG. 3A). The darker coloration/tone results from redness and dryness ("chapping"). FIG. 3B illustrates the left hand with lotion spotted over the crepey appearing skin prior to smoothing the oatmeal lotion over the back of the hand. FIG. 3C illustrates the hands post-application of lotion and the disappearance of the fine lines. The hands are similarly held together with light tensioning as in FIG. 3A evidenced by the matching of predominant wrinkles visible in FIG. 3A. The skin on the knuckles of the left hand's index and second finger match in tone that of the adjacent skin, indicating reduced appearance of redness. Also, fine wrinkles and "crepe"-like appearance have been significantly reduced and the skin appears to have an even tone and smoothness. FIG. 3D illustrates the hands again tensioned in same manner, this time showing more of the back of the hand. The lotion may be observed to have "absorbed into" the skin, giving a matte rather than shiny, but still soft and supple appearance. The photographs were taken sequentially within about a four-minute time period. The short interval between pictures indicates the efficacy and rapidity with which the oatmeal lotion improved the subject's skin condition and appearance. The lotion provided soothing and smoothing, seen as a reduction of the crepey-ness of the surface of the chapped and crepey skin complexion.

Example 4

User Tolerance—Young Child with Severe Eczema

A young child with acute eczema was known to be intolerant to commercial lotions and prescribed treatments. Application of "commercial" sunscreens provided no or a poor affect. The child's pediatrician had prescribed bleach baths as a last-ditch treatment. Application of about 10% sunscreen (Formulation of Method 2) and colloidal oatmeal (Eczema) lotion (Formulation of Method 4) were found to improve the skin condition of the child.

The inventor notes under conditions of free use and uncontrolled dose three adult eczema suffers each reported relief from their eczema symptoms following extended use of the colloidal oatmeal lotion. While not wishing to be bound by any theory it is hypothesized that the anti-inflammatory effects of the colloidal oatmeal in conjunction with those of the Aloe vera extract and Calendula extract and the anti-microbial properties of jojoba oil provide a soothing and non-irritating topical lotion creating a microenvironment facilitating the healing and renewal of skin afflicted with eczema.

Example 5

User Tolerance in Fair-Skinned Individuals Exposed to Equatorial Sunshine and UV-A/UV-B Radiation Five individuals of Northern European decent with minimal lifetime sun exposure had travelled to Hawaii with the claimed sunscreen composition having about 10% Zinc oxide (Method 2). Each individual conducted comparisons of the claimed sunscreen composition with commercially available sunscreens. Anecdotal data demonstrated failures when using commercial sunscreen lotions as each individual experienced a range of failures to prevent each person's skin from sun burning and/or experienced comedogenicity (acne development). Each of the five individuals reported they remained sunburn free and absent development of comedogenicity when in the sunshine of the Hawaiian Islands when using the claimed sunscreen compositions. The claimed sunscreens were found to remain adherent to their skin despite perspiration and/or water exposures such as swimming, water-sliding and snorkeling.

End-user testing has also shown that topical lotions absent chemically-formulated ingredients were naturally non-irritating, non-itching, non-inflammatory, and non-blistering of the skin and not prone to induce skin swelling. It has been found that the claimed compositions were well tolerated in all populations tested including, but not limited to, sun-sensitive individuals, e.g., infants, children, sun naïve adults, Eczema sufferers and the elderly. Topical application of the claimed compositions in the sensitive eye area were also well tolerated. Thus, applicant has developed, formulated and produced topical skin/dermal lotions that can provide relief from skin diseases, prevent and avoid skin sun burning during outdoor daylight activities, including, but not limited to, sitting, playing, walking, swimming, perspiration upon physical exertion or high temperatures. Furthermore, the claimed compositions can sooth, smooth, and minimize fine skin lines, moisturize and relieve skin dryness, preclude skin/dermal aging, promote healing, relieve irritations, and sooth sun burned skin. Moreover, the disclosed lotions can be used on sensitive skin and around delicate skin areas without being irritating, pore-clogging or impeding natural skin respiration and perspiration to assist in and promote healthy skin maintenance.

Therefore, the disclosed formulations and claimed compositions, having an essential absence of chemically-formulated constituents, additives and active ingredients supra, and have surprisingly been shown to have extended shelf-life stability, absence of emulsion breakdown and were free of fungal contamination development despite the absence of industry accepted, if not necessitated and/or proactively/preventively added, use of chemically-formulated constituents, additives and active ingredients. Furthermore, the disclosed formulations and claimed compositions meet the requirements of 21 CFR for safety, efficacy and stability.

Throughout this specification, unless the context requires otherwise, the word "comprise", or variations such as "comprises" or "comprising", will be understood to imply the inclusion of a stated constituent or integer or group of constituents or integers but not the exclusion of any other constituent or integer or group of constituents or integers.

Throughout the specification the aim has been to describe the envisioned embodiments of the invention without limiting the invention to any one embodiment or specific collection of features. Those of skill in the art will therefore appreciate that, in light of the instant disclosure, various modifications and changes can be made in the embodiments exemplified without departing from the scope of the present invention. All such modifications and changes are intended to be included within the scope of the disclosure. For example, the above-described methods (or one or more aspects thereof) may be used in combination with each other. Other embodiments can be used, such as by one of ordinary skill in the art upon reviewing the above description. Various embodiments may be grouped together but should not be interpreted that an unclaimed disclosed feature is intended as an essential feature to any claim. Inventive subject matter may lie in less than all features of a particular disclosed embodiment. It is intended that the scope of what is disclosed be defined by the following claims and their equivalence.

What is claimed:

1. A composition for topical applications to the skin of a subject comprising:
   an emulsion of an aqueous phase and an oil phase,
   a. the aqueous phase comprising:
      i. about 25.5-47.4 wt. % of at least aloe vera juice as an aqueous carrier,
      ii. about 2.6-2.9 wt. % of glycerin as a humectant constituent,
      iii. about 1.40-1.53 wt. % borax as a first emulsification agent constituent, and
   b. an oil phase comprising:
      i. about 30.3-33.5 wt. % of at least jojoba oil as an emollient constituent,
      ii. about 11.3-12.5 wt. % coconut oil as a surfactant constituent, and
      iii. about 6.01-6.71 wt. % beeswax as a second emulsification agent constituent, and
      iv. about 0.1-25.0 wt. % zinc oxide as a first additive constituent,
   wherein the composition is an individualized, personal care product for the subject,
   wherein the composition has an essential absence of chemically-formulated constituents:
   emulsifiers, pesticides, thickeners, stabilizers, buffers, anti-microbials, artificial preservatives, and artificial additives,
   wherein optionally, the aloe vera juice has extracted a botanical extraction,
   wherein the botanical extraction is a rich botanical extract, wherein the ratio of the aqueous phase to the oil phase is about 1:1,
wherein an emulsifier is formed in situ during dispersal of the aqueous phase composition in the oil phase, and
wherein the composition is at least one of protective, non-irritating, stable, environmentally friendly, and combinations thereof.

2. The composition of claim 1, further comprising about 0.1-2.0 wt. % of each of a second or more additives as a wt. % of the total composition selected from the group consisting of red ferrous oxide, yellow ferrous oxide and black ferrous oxide.

3. The composition of claim 1, wherein there is about 25.5-29.2 wt. % aloe vera juice and further comprises about 16.4-20.1 wt. % calendula extract in the aqueous phase, and an essential absence of the first additive constituent.

4. The composition of claim 1, wherein there is about 25.5-47.4 wt. % aloe vera juice, an essential absence of zinc oxide, and further comprising as a wt. % of the total composition about 0.1 wt. % to about 25.0 wt. % colloidal oatmeal as the first additive constituent.

5. The composition of claim 1, wherein each constituent of the aqueous and oil phases is essentially organic and/or naturally occurring.

6. The composition of claim 1, wherein the composition is biodegradable.

7. The composition of claim 1, wherein the composition is at least one of non-acnegenic, non-comedogenic, hypoallergenic, and easily adherent.

8. The composition of claim 1, wherein the composition is at least one of mild, non-irritating, quick drying, non-sticky, and non-drying.

9. The composition of claim 1, wherein the emulsified composition is selected from the group consisting of an oil-in-water emulsion, a water-in-oil emulsion, an oil-in-water-in-oil emulsion, and a water-in-oil-in-water emulsion.

10. The composition of claim 1, wherein the emulsified composition is a topical formulation in the form of a lotion, a solution, a gel, an ointment, a patch, a paste, a liquid, a foam, a mousse, a spray, an aerosol, a triple emulsion, a nanoemulsion, a microemulsion, a hydrogel, a jelly, a dispersion, a suspension, and a tape.

11. The composition of claim 1, wherein the composition provides at least one of a cosmetic effect and/or pharmaceutical effect.

12. The composition of claim 11, wherein the at least one pharmaceutical effect is selected from the group consisting of moisturizing, soothing, smoothing, inhibition of: solar radiation effects, itchiness, inflammation, a skin disorder(s) and/or irritation(s), and avenanthramide activities.

13. A pharmaceutical formulation for use in the inhibition, treatment or amelioration of a skin disorder or condition comprising applying the composition of claim 4.

14. A cosmetic formulation for use in the inhibition, treatment or amelioration of a skin disorder or condition comprising applying the composition of claim 2.

* * * * *